(12) United States Patent
Popat

(10) Patent No.: US 11,913,281 B1
(45) Date of Patent: Feb. 27, 2024

(54) AUTOMATED WINDOW-SHADING SYSTEM AND METHOD ADAPTABLE TO VARYING LEVELS OF INTEGRATION WITH OTHER SYSTEMS

(71) Applicant: Pradeep Pranjivan Popat, Arlington, VA (US)

(72) Inventor: Pradeep Pranjivan Popat, Arlington, VA (US)

( * ) Notice: Subject to any disclaimer, the term of this patent is extended or adjusted under 35 U.S.C. 154(b) by 775 days.

(21) Appl. No.: 17/030,183

(22) Filed: Sep. 23, 2020

Related U.S. Application Data

(63) Continuation-in-part of application No. 16/383,642, filed on Apr. 14, 2019, now abandoned.

(60) Provisional application No. 62/657,883, filed on Apr. 15, 2018.

(51) Int. Cl.
*F24F 11/65* (2018.01)
*E06B 9/68* (2006.01)

(52) U.S. Cl.
CPC ................ *E06B 9/68* (2013.01); *F24F 11/65* (2018.01); *E06B 2009/6818* (2013.01)

(58) Field of Classification Search
CPC ..... E06B 9/68; E06B 2009/6818; F24F 11/65
See application file for complete search history.

(56) References Cited

U.S. PATENT DOCUMENTS

| 5,598,000 A | 1/1997 | Popat | |
| 9,834,983 B1 * | 12/2017 | Hall | E06B 9/32 |
| 9,988,841 B2 * | 6/2018 | Hall | E06B 9/24 |
| 2008/0283621 A1 * | 11/2008 | Quirino | F24F 11/65 236/1 C |
| 2012/0261079 A1 | 10/2012 | Chambers | |
| 2013/0261799 A1 * | 10/2013 | Kuhlmann | H04L 12/2816 700/275 |

(Continued)

OTHER PUBLICATIONS

Website at www.intelliblinds.com, published circa 2014 by Pradeep Popat in Arlington, VA, USA. Particularly relevant is the page at http://www.intelliblinds.com/description.html, Section "Works 24-7", which describes multi-mode operation of an automated blinds system in which the selected operating mode depends on the day/night state as well as the on/off state of the room lights (as a proxy for room occupancy).

*Primary Examiner* — Gary Collins

(57) ABSTRACT

A system for, and method of, automated window-shading which uses predefined hierarchies of information to select the best available information from multiple sources, and thereby supports varying levels of integration with other systems. A preferred embodiment includes enough functionality to perform automated functions on its own, but also includes low-level and high-level interfaces to accept information from external devices and systems to provide additional automated shading functionality. It executes operating steps that include the application of predefined hierarchies to select the best available information in order to select a mode of operation and determine a window-shading setting. In this way, the system is capable of supporting varying levels of integration with other systems, including fully autonomous operation without integration, partial integration via a low-level interface that does not require IT overhead and does not present cybersecurity risks, and full integration with a Building Management System.

17 Claims, 13 Drawing Sheets

(56) References Cited

U.S. PATENT DOCUMENTS

2014/0027069 A1* 1/2014 Oppizzi .................... E06B 9/40
                                                                            160/6
2014/0303788 A1* 10/2014 Sanders ................ H05B 47/17
                                                                           700/276

* cited by examiner

AUTOMATED WINDOW-SHADING SYSTEM AND METHOD ADAPTABLE TO VARYING LEVELS OF INTEGRATION WITH OTHER SYSTEMS

CROSS-REFERENCE TO RELATED APPLICATIONS

This is a continuation-in-part of application Ser. No. 16/383,642, filed with title "Automated Window-Shading System and Method Adaptable to Varying Levels of Integration with Other Systems" and naming Pradeep P. Popat as inventor, which claims the benefit of provisional application Ser. No. 62/657,883, also naming Pradeep P. Popat as inventor.

BACKGROUND

This invention is in the field of automated window-shading systems, and specifically systems which are capable of operating autonomously but can also provide additional functionality when connected to, and functionally integrated with, external devices and systems.

Automated Window Shading

An automated shading system is a system capable of adjusting window shading automatically, without human intervention. An automated shading adjustment can entail two processes: the process of determining a target (desired) setting of a shading device, and the process of actually adjusting the shading device to that target setting. The former process entails an automated shading protocol (also referred to herein as a shading protocol) that uses predetermined algorithms, steps, rules, or logic that act upon information such as sensor outputs, weather predictions, user commands, clock/calendar data, etc. to determine the target setting. The latter process entails actuating the shading device using an electromechanical actuator (for moveable window coverings) or an electronic driver (for smart windows) to the target setting under either closed-loop or open-loop control. The target setting may refer to the setting of the shading device itself (e.g. the slat-tilt angle of a venetian blind), or to the result of a shading adjustment (e.g. the resulting illuminance of admitted daylight on a desk).

An automated shading system requires at least a shading device (e.g. a blind, shade, curtain, shutter, or smart window), a controller (e.g. a microcontroller or a computer) that implements the shading protocol, and one or more sources of information upon which the protocol operates (e.g. a sensor, a user interface, a pre-stored shading setting, or an interface to another device or system). The controller may or may not be physically co-located with the shading device, and may be dedicated to the shading device or shared among many shading devices. The controller may be dedicated to automated window shading or may also perform other functions (e.g. lighting control).

Relative to manually adjusted window shading, automated window shading systems can save energy and enhance the comfort, convenience, security, and even enhance the productivity and health of building occupants. The effectiveness with which an automated shading system provides these benefits depends largely on the automated shading protocol and the information used to feed it.

Integration with Other Systems

The trend in the art is toward integrating automated window shading functionality with other automated functions, such as for lighting, security, or Heating, Ventilation and Air-Conditioning (HVAC). The integration can occur on a wide scale, e.g. as in the Internet-of-Things (IoT), or on a smaller scale via a dedicated building-management network. Such integration provides the automated shading protocol with information from a variety of sources, potentially enhancing its effectiveness.

In such a system, the automated shading protocol is typically implemented by a centralized controller which has access to all of the information across the integrated system. In addition to providing more information for the shading protocol, this enables coordinated operation of the different functions (e.g. shading, lighting, etc.), provides economies of scale by allowing system elements such as user interfaces and sensors to be shared among the functions, and can provide a framework that facilitates addition of new hardware and functionality to an existing installation.

Risks and Challenges Associated with Integration

Unfortunately, the market has not yet settled on standards for such integration, nor approaches for ensuring the security of such integrated systems against cyber threats. As a result, manufacturers of automated shading systems are currently forced to choose between waiting to add the capability for integrated operation (and thereby risking the loss of market share), or else committing to one of many competing standards, each of which could eventually be rejected by the marketplace.

Thus, there are currently relatively few automated shading products capable of integration with other systems, and all are relatively expensive.

Further, fully integrated systems have received mixed reviews in the marketplace. For example, in office buildings, tenants are often dissatisfied with the automated shading adjustments made by integrated systems intended to save energy. If manual overrides are available, occupants often disable or override automatic operation, which reduces the energy savings and weakens the value proposition of such systems to building owners/operators.

Likely due to all these factors, fully integrated automated shading has not yet been embraced by either the commercial or residential markets.

Objects and Advantages

It is therefore an object of the invention disclosed herein to provide a cost-effective automated shading system and method which supports various levels of integration, ranging from the ability to operate fully autonomously (with no integration necessary), to the ability to operate in a partially integrated mode via low-level integration with other systems in a manner which avoids risks associated with high-level integration, to the ability to operate in a fully integrated manner with other systems.

It is another object of the invention disclosed herein to provide an automated shading system and method which optimally exploits the information available through various levels of integration in order to maximize automated shading effectiveness.

Further objects and advantages will become apparent from a consideration of the drawings and accompanying description.

SUMMARY OF THE INVENTION

The subject invention is a system for, and method of, automated window-shading that implements a protocol which uses predefined hierarchies of information to select the best available information from multiple sources of information, and thereby supports varying levels of integration with other devices and systems.

A preferred embodiment includes enough sensor and control functionality to perform automated functions on its own, but also includes one or more interfaces to accept information from external devices and systems in order to provide additional automated shading functionality. It executes operating steps that include the application of predefined hierarchies to select the best available information in order to select a mode of operation and determine a window-shading setting. In this way, the system is capable of automatically supporting varying levels of integration with other systems, including fully autonomous operation without integration, partial integration via a low-level interface that does not require IT overhead and does not present cybersecurity risks, and full integration with a Building Management System.

LIST OF REFERENCE NUMERALS

Figure 1:
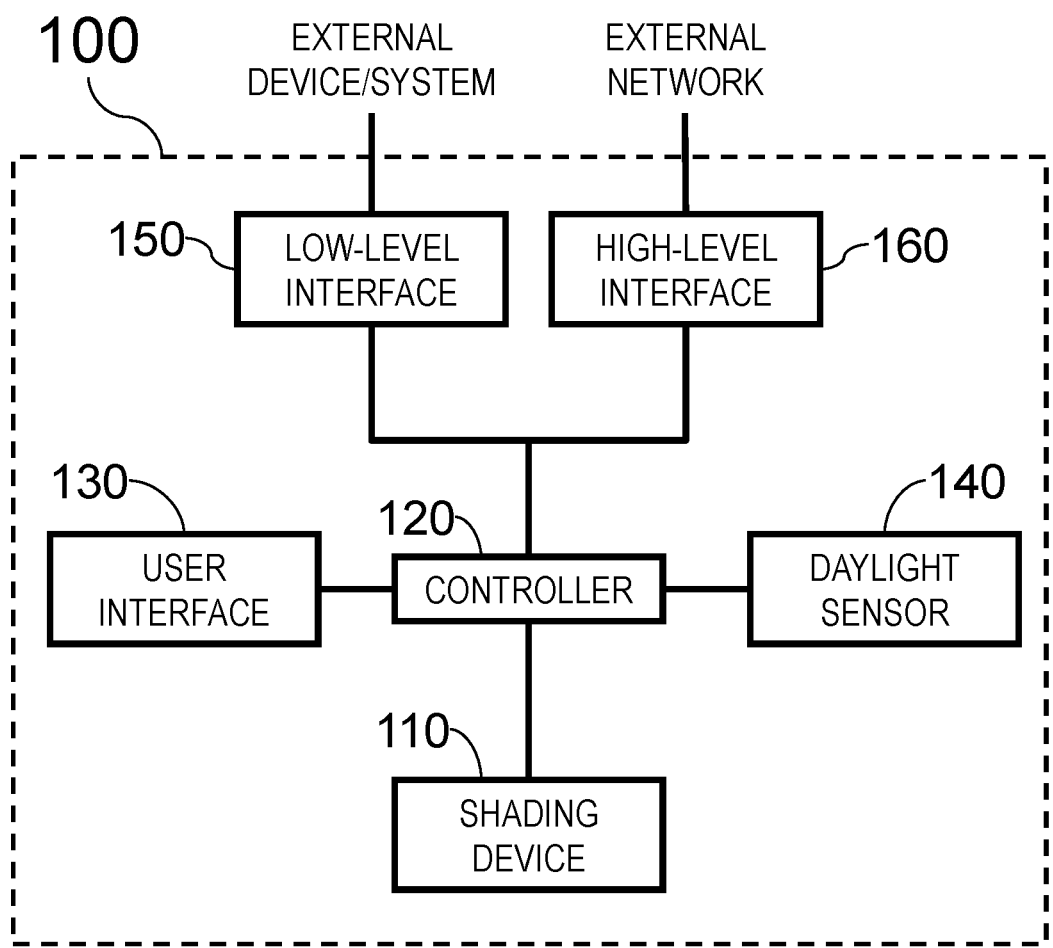
FIG. 1 is a block diagram of a preferred embodiment of the subject automated shading system.

100 Automated shading system
100' Automated shading system
110 Shading device
110' Shading device
120 Controller
130 User interface
140 Daylight sensor
150 Low-level interface
150A Channel A of low-level interface
150B Channel B of low-level interface
160 High-level interface
160A External interface
160B Protocol bridge
201 Decision step
202 Adjustment step
203 Decision step
204 Inference step
205 Selection step
211 Decision step
212 Inference step
212' Inference step
213 Determination step
213' Determination step
214 Adjustment step
221 Decision step
222 Inference step
223 Adjustment step
231 Adjustment step
241 Registering step
242 Decision step
243 Equating step
244 Determination step
245 Moving summation step
246 Decision step
247 Decision step
341 Registering step
345 Moving summation step
346 Decision step
347 Decision step
348 Assignment step
349 Assignment step
350 Adjustment step
460 Source of HVAC mode information
470 Source of room-temperature information
480 Source of window-temperature information

LIST OF SPECIAL TERMS

The following table lists special terms (including acronyms), in italics, used in this disclosure which have particular significance in describing the subject invention or which have meanings that may differ from those in general usage, and provides the meaning for each special term in the context of this disclosure:

| Term | Meaning |
| --- | --- |
| Assuming means | A determining means for determining a datum of information on the basis of assumed information, e.g. previous or a priori information. For example, room-temperature determining means can be room-temperature assuming means, in which a specific room temperature is assumed on the basis of a known average room temperature. |
| Automated shading protocol | The algorithms, steps, rules, or logic by which an automated shading system acts upon information (e.g. sensor outputs, weather predictions, clock/calendar outputs, predefined user preferences, utility rate schedules, etc.) to make decisions regarding window-shading adjustments, including selecting operating modes and determining target (desired) shading settings for automated shading adjustments. |
| BMS (Building Management System) | A system which controls one or more building subsystems, such as lighting, Heating, Ventilation, and Air-Conditioning (HVAC), or access. |
| (to) Close a shading device | To operate a shading device toward its fully closed position. |

| Term | Meaning |
| --- | --- |
| Closed setting | A setting of a shading device that is being operated according to a shading protocol, such that the shading device is either (a) fully closed, or (b) more closed than it would be if it were not operated according to that shading protocol. |
| Daylighting protocol | An automated shading protocol aimed at maximizing energy savings through daylighting. |
| Daytime Bit | A binary variable representing daytime versus nighttime. The value of the daytime bit can be based, e.g., on the exterior lighting level or on the clock time. |
| Determining means | A means of obtaining a datum of information, such as a temperature, a binary (yes/no) assessment of room occupancy, the mode of an HVAC system, or other data. For example, an automated shading protocol that bases a decision upon the room temperature can use room-temperature determining means to obtain the room temperature. Determining means can include assuming means, inferring means, sensing means, and receiving means, each of which is also defined herein for purposes of this disclosure. |
| Hierarchy | A ranking according to importance or value. This disclosure refers to several hierarchies: a hierarchy of automated shading benefits (which, in turn, can be translated into a hierarchy of operating modes), a hierarchy of information needed by an automated shading protocol, a hierarchy of sources of that information, and a hierarchy of target shading settings for an automated shading adjustment. |
| Inferring means | A determining means for determining a datum of information via inference from other information. For example, HVAC-mode determining means to determine the mode of an HVAC system can be HVAC-mode inferring means, in which the HVAC mode is inferred on the basis of the current season. |
| Interface | A means of exchanging information between devices or systems. |
| Interface (low-level) | An interface to another system which does not require a layered protocol (and therefore avoids IT overhead and cybersecurity risks while also minimizing potential incompatibilities with other systems). It can be, e.g., a hardwired discrete, parallel, or serial interface, and it may be a unidirectional interface in which information is received from, but not transmitted to, another system. |
| Interface (high-level) | A bidirectional interface implementing a layered protocol that enables its host system to be networked with other systems. Per the current trend in the art, this requires a high-level network interface with multiple abstraction layers. For example, the Open Systems Interconnection (OSI) network interface model defines seven abstraction layers, ranging from the low-level physical and electrical layers up to the application layer. The lower levels are typically implemented in hardware, while the higher levels are typically implemented in software (including firmware). The software implementation of higher-level layers is often referred to as a protocol stack. |
| Occupancy Bit | A binary variable representing occupancy of an area shaded by an automated shading system. The value of the occupancy bit can be based, e.g., on the output of an occupancy sensor or on clock/calendar information (in conjunction with an occupancy schedule). |
| (to) Open a shading device | To operate a shading device toward its fully open position. |
| Open setting | A setting of a shading device that is being operated according to a shading protocol, such that the shading device is either (a) fully open, or (b) more open than it would be if it were not operated according to that shading protocol. |
| Operating mode | A manner of operation of an automated shading system aimed at providing a specific benefit or achieving a particular object, e.g. energy savings. |
| Preferred-Setting protocol | An automated shading protocol aimed at providing occupants' preferred shading settings. |
| Receiving means | A determining means (see definition herein) for obtaining a datum of information by receiving it from another device or system. |
| Room temperature | The temperature in a space-conditioned room, typically nearly equal to the temperature set-point (i.e. thermostat setting) of the space-conditioning (e.g. HVAC) system. |
| Sensing means | A determining means for obtaining a datum of information using a sensor, e.g. a thermistor . . . |
| Shading setting | The setting of an operable shading device in an automated shading system. A target or desired shading setting is a setting which is determined, e.g., by an automated shading protocol, to which the shading device is then operated by the system. |
| Software | Predefined operating steps for a programmable device stored in either a volatile or a non-volatile storage device (e.g. RAM, ROM, EEPROM, Flash, etc.). Thus, this definition of software includes firmware. |
| Thermal management protocol | An automated shading protocol aimed at minimizing loads on an HVAC system. |

DETAILED DESCRIPTION OF THE INVENTION

The subject invention is a system for, and method of, automated window-shading that uses predefined hierarchies to adapt to the presence and absence of information from external sources, and thereby automatically support varying levels of integration. According to the invention, the following types of hierarchy can be predefined:

A hierarchy of automated shading benefits can be predefined, which can be used in a multi-mode system to select the operating mode that provides the greatest net benefit.

A hierarchy of operating modes can be defined, which can be used to select the highest-priority operating mode from among several candidate modes.

A hierarchy of sources of information needed to determine a window-shading setting can be predefined. Such a hierarchy can be used to select the most reliable source of information from which to determine the shading setting.

A hierarchy of information needed to determine a window-shading setting can be predefined. Such a hierarchy can be used to select the most reliable information from which to determine the shading setting. In this case, the hierarchy is applied to the information itself (e.g. a sensor datum), and not to the source of the information (e.g. the sensor itself).

A hierarchy of sources of window-shading settings (e.g. multiple controllers) can be predefined. Such a hierarchy can be used to select the window-shading setting which will yield the most effective operation.

A preferred embodiment includes sufficient sensor and control functionality to perform automated functions on its own, but also includes a low-level interface (which may be a receive-only interface and which may be capable of accepting only discrete signals) and a high-level interface (which may be a bidirectional network interface with layered protocols) to accept information from external sensors and systems in order to provide additional automated shading functionality. It executes operating steps that include application of predefined hierarchies to select a mode of operation and determine a window-shading setting. In this way, the system is capable of automatically supporting varying levels of integration with other systems, including fully autonomous operation without integration; partial integration via a low-level interface that does not require support from Information Technology personnel and does not present cybersecurity risks; and full integration with a Building Management System.

Principle of Operation

The subject invention is based on two ideas which can be exploited both individually and in combination:
- The value of automated shading is driven by a hierarchy of distinct benefits.
- The information needed by an automated shading protocol can be obtained from a variety of sources, and such sources—and the information they provide—can be ranked in a hierarchy according to their expected reliability, trustworthiness, or value.

Either or both of these hierarchies—a hierarchy of benefits and a hierarchy of information sources and content—can serve as the basis for an automated shading protocol that maximizes the net benefit of automated shading, while gracefully adapting to varying sources and qualities of information (and, thus, varying levels of integration with external sensors and systems).

The general method of automated shading according to the subject invention includes the following steps:
- defining at least one of the following types of hierarchy:
  - a hierarchy of benefits of automated shading,
  - a hierarchy of operating modes of an automated shading system,
  - a hierarchy of sources of information needed by an automated shading protocol,
  - a hierarchy of information needed by an automated shading protocol; or
  - a hierarchy of window-shading settings from various sources or obtained in various ways;
- using the defined hierarchy to select at least one of the following:
  - a benefit of automated shading from among a plurality of benefits,
  - an operating mode of an automated shading system from among a plurality of operating modes,
  - a source of information needed by an automated shading protocol from among a plurality of information sources,
  - a datum of information needed by an automated shading protocol from among a plurality of data; or
  - a window-shading setting for an automated shading adjustment from among a plurality of window-shading settings;
- using the selected benefit, mode, information source, information datum, or shading setting to determine the setting of a shading device for an automatic adjustment; and
- adjusting the shading device to the that setting.

Benefits of Automated Window Shading

Automated window shading can potentially provide two major benefits: increased occupant satisfaction and reduced energy consumption:
- People typically do not adjust manually-operated shades in order to save energy. Instead, manually operated shades are typically closed to control glare or provide privacy, and are typically opened to maximize natural illumination and provide an outward view when there is no risk of glare or need for privacy. Automated shading can enhance occupant satisfaction by minimizing the need for such manual adjustments and, ideally, by responding more quickly and effectively to changing conditions than would be practical with manual operation.
- Automated shading can save energy by maximizing glare-free daylight (which can then be "harvested" by a daylight-harvesting lighting control) or by minimizing solar loads on the HVAC system. For purposes of this disclosure, an automated shading protocol aimed at maximizing glare-free daylight for daylight-harvesting is referred to as a daylighting protocol, while one aimed at minimizing loads on the HVAC system is referred to as a thermal-management protocol.

Achieving these benefits can impose conflicting requirements on the shading setting. For example, occupants may prefer closed shades at nighttime to maximize privacy, but minimization of HVAC loads may call for open shades at nighttime in the summer to maximize radiative cooling. As another example, minimization of energy used for lighting may call for open shades during daytime, but minimization of solar loads on the HVAC system may call for closed shades.

Techniques are known in the art for determining the optimum shading setting to minimize overall energy consumption (considering the impacts on both lighting and HVAC loads). Such techniques comprehend factors such as installed lighting power density and efficiency, shading device characteristics, building envelope characteristics, HVAC system characteristics, façade orientation, geographic location, season, and weather. Exploiting such techniques typically requires tight integration of the automated shading system with other building systems and sensors, as well as a complex shading protocol and commissioning process. This has so far limited the market penetration of systems using such techniques.

Another issue with such techniques is that there is, as yet, no established technique in the art for determining an optimum shading setting that considers occupant satisfaction as well as energy savings. Integrated, tightly coupled building systems can actually decrease occupant satisfaction in two ways: physically, by creating conditions contrary to occupant preferences (e.g. excessively closed or open shades); and psychologically, by depriving occupants of a sense of control over their own environment. The current solution in the art to this problem is to provide "manual overrides", e.g. by allowing occupants to adjust window shades away from the algorithmically-determined optimum settings. Obviously, this reduces the energy savings and weakens the value proposition of the tight integration necessary to implement such systems.

Hierarchy of Benefits and Multi-Mode Operation

Another solution to resolving conflicts between the shading settings required to achieve the various automated shading benefits described above is to establish a hierarchy of benefits. Then, rather than determining an optimum shading setting that balances the various benefits, the automated shading system can operate to maximize whichever benefit is ranked highest in the hierarchy for the prevailing conditions. For example, a preferred embodiment of the subject invention assumes the following hierarchy of benefits:
- Occupant satisfaction is the most critical benefit of automated shading. Conversely, an automated shading system that fails to address occupant satisfaction could experience rapid failure in the market. Maximizing occupant satisfaction entails maintaining the occupants' preferred level of glare-free daylight during daytime, and adjusting the shading to predetermined occupant-preferred settings at nighttime.

Daylighting is the next most important benefit of automated shading, for two reasons. First, in some buildings (e.g. those with relatively inefficient lighting systems), the energy savings provided by a daylighting protocol will often exceed those provided by a thermal-management protocol. Second, occupants typically prefer daylight to artificial light, so there is substantial overlap between daylighting and occupant satisfaction.

Thermal management is also a significant benefit of automated shading, but less important than occupant satisfaction and less important than daylighting in buildings with relatively inefficient lighting systems (but more important than daylighting in buildings with state-of-the-art lighting).

An automated shading system can exploit this hierarchy via multi-mode operation, with each mode aimed at maximizing a particular benefit. For example, an automated shading system could operate in three modes:

A daylighting mode could be engaged during daytime when the windowed space is occupied. When in the daylighting mode, the system would adjust the shading to maintain the occupants' preferred level of glare-free daylight. This would maximize occupant satisfaction while also increasing useful natural illumination (relative to manually operated shading), and thereby enable energy savings via daylighting.

A preferred-setting mode could be engaged at nighttime when the windowed space is occupied. Upon entry into this mode, the system would adjust the shading to whatever setting is preferred by the room occupants.

A thermal-management mode could be engaged whenever the windowed space is unoccupied. When in this mode, the system would either fully open or fully closed the shading as needed to minimize loads on the building's HVAC system.

This type of multi-mode operation provides an effective way of maximizing the overall benefit (per the hierarchy above) provided by automated shading.

Information Needed by Shading Protocol

In a multi-mode system of the type described above, two types of information are needed by the shading protocol:
information necessary to select the mode of operation; and
information necessary to determine the required shading setting in each mode.

Information Needed to Determine Mode of Operation

At least two bits of information are needed to choose between the three modes of operation described above:
A daytime bit whose two values correspond to daytime and nighttime.
An occupancy bit whose two values correspond to the windowed space being occupied and unoccupied.

Information Needed to Determine Required Shading Setting

At least three types of information are needed to determine the required shading setting for each of the three modes of operation described above:
The system needs to know the occupants' preferred shading setting at nighttime, which could depend on the on/off state of room lights. For example, occupants may prefer the shading to be closed when the lights are on (to maintain privacy), but may prefer the shading to be open when the lights are off (to provide a view of the nighttime sky).

The system needs to know the shading setting that would minimize HVAC loads. This will be the either fully closed setting or the fully open setting, depending on the prevailing mode of the HVAC system (e.g. if the HVAC system is in cooling mode, then HVAC loads would be minimized with the shades closed during daytime but open at nighttime).

The system needs to know the shading setting necessary to maintain the occupants' preferred level of glare-free daylight. This requires information regarding the daylight set-point (which can be obtained from a user-system interface, e.g. by allowing users to adjust the shading to provide the desired daylight level and then storing that level as a set-point) as well as information regarding the actual interior daylight level (for closed-loop control) or the actual exterior daylight level (for open-loop control).

Sources of Information

The information needed by an automated shading protocol can be obtained from a variety of sources. For example:

The information needed to establish the value of the daytime bit could be inferred from a real-time clock, or from a daylight sensor, or obtained from an internet service.

The occupancy bit could simply be assumed to be set (on the basis of the previously outlined benefits hierarchy, which prioritizes occupant satisfaction), or could be based on the output of an occupancy sensor, or could be inferred from the on/off state of the lighting system, or (in a commercial building) could be inferred from the work schedule and the current time.

The shading setting for the preferred setting mode could be determined on the basis of general assumptions regarding peoples' shading preferences (i.e. that they prefer closed shades at nighttime to ensure privacy), or by an actual occupant-preferred setting stored in a memory.

The shading setting for the HVAC mode could be obtained via assumptions regarding the dominant year-round HVAC mode in the host building (e.g. the heating mode in Minneapolis, MN, USA), or inferred from the current season as determined from a real-time clock/calendar, or inferred from an external temperature sensor, or obtained directly from the HVAC system via an interface.

According to the subject invention, each such source of information, or each datum obtained therefrom, can be ranked in a hierarchy based on its reliability or trustworthiness, i.e. the expected appropriateness of the shading setting or operating mode obtained as a result of that information.

For example, in the hierarchy of sources of information needed to determine the HVAC mode, a mode signal provided by the HVAC system itself would be ranked higher than an assumption about the dominant year-round HVAC mode, because it would lead to greater energy savings. Similarly, in the hierarchy of sources of information needed to determine the value of the occupancy bit, the output of an occupancy sensor would be ranked higher than an assumption regarding occupancy, because the former is more likely to be correct and would therefore lead to greater occupant satisfaction.

In general, assumptions would have the lowest rank in such an information hierarchy, while some direct information from a trusted source (e.g. a BMS) would rank highest. Information inferred from some sensor outputs or a real-time clock calendar might have an intermediate rank. Information from some sensor outputs (e.g. a daylight sensor) might be ranked higher than some direct information from a BMS, e.g. for closed-loop daylight control.

Leveraging the Information Hierarchy

After an information hierarchy has been defined, an automated shading system or protocol can use it to select the highest-ranking available source of each required piece of information. For example, in order to determine the HVAC mode, the system can first poll external interfaces to see if such information is available; if not, it can check local sources (e.g. a means of determining the length of the day, such as a real-time clock calendar or a daylight sensor); if not, it can simply assume the dominant year-round HVAC mode for the prevailing location. Thus, the system can gracefully adapt to the presence or absence of information sources while maximizing automated-shading effectiveness.

Synergistic Use of Benefits Hierarchy with Information Hierarchy

The above-described benefits and information hierarchies are both advantageous for automated shading when used individually, but are especially advantageous when used together.

For example, when used together, they enable an automated shading system and method which is not only capable of adapting to varying levels of integration with other systems, but also provides virtually all of the benefits of fully integrated operation without the need for a high-level network interface.

Reduced Interface Requirements

In a conventional integrated system, the automated shading protocol is implemented by a centralized controller which needs information from each shading device and shaded area (e.g. the current shading setting, interior daylight level, exterior daylight level, etc.), and provides target shading settings to the shading device. The bandwidth required for this bidirectional information exchange is high enough to require an interface to the shading equipment that supports bidirectional multi-bit communication, e.g. ZigBee or BACnet MS/TP via RS-485. This forces a choice from among competing and potentially incompatible interface technologies.

However, by exploiting benefits and information hierarchies and multi-mode operation as described above, most of the benefits of fully integrated operation be achieved via a simple unidirectional discrete interface to the shading system. This is advantageous in the current market situation, because such an interface does not present the interoperability issues and potential vulnerabilities to cyber threats associated with higher-level interfaces.

The preferred embodiment described below is one example of a system and method of automated shading that leverages both a benefits hierarchy and an information hierarchy in such a way.

FIG. 1: Hardware Configuration of Preferred Embodiment

A preferred embodiment of the subject automated shading system is intended to be capable of fully autonomous operation (without need for integration with other systems), but also to be capable of taking advantage of information from other systems to provide increased automated shading functionality. FIG. 1 is a block diagram of the hardware configuration of a system 100 that offers this capability.

System 100 includes a conventional shading device 110 actuated by a conventional programmable controller 120. Shading device 110 can be, e.g., a venetian blind, and controller 120 can be, e.g., a microcontroller-equipped motorized actuator which adjusts the slat tilt angle of the venetian blind according to a programmable algorithm, i.e. an automated shading protocol. Controller 120 is thus capable of controlling the shading provided by shading device 110. In the preferred embodiment, shading device 110 is a conventional mini-blind, and controller 120 is a conventional actuator that includes a microcontroller which controls an H-bridge motor driver, which in turn drives a DC gear-motor, which in turn is coupled to the slat-tilt-adjustment shaft of shading device 110. The gear-motor also includes a shaft encoder which can be read by controller 120 to enable closed-loop control.

System 100 also includes a user interface 130 which is interfaced to controller 120. User interface 130 could be as simple as a pair of momentary-contact switches hardwired to controller 120, or could be implemented as an application running on a smart device (e.g. a smartphone) connected to controller 120 via Bluetooth or a network interface. In the preferred embodiment, user interface 130 is a pair of switches hardwired to controller 120 that allows a user to command controller 120 to increase and decrease the shading setting (i.e. slat-tilt angle) of shading device 110.

System 100 also includes a conventional daylight sensor 140 which is capable of producing a signal representing the actual daylight level in the area shaded by shading device 110, which signal can be registered by controller 120. Daylight sensor 140 could be implemented as the combination of an outward-facing sensor that senses the daylight incident on shading device 110 and software steps executed by controller 120 to infer the actual daylight level admitted by shading device 110. Alternatively, daylight sensor 140 could be implemented as the combination of a conventional Work-Plane Illuminance (WPI) sensor and software steps executed by controller 120 to infer the daylight level by subtracting a known artificial lighting level from the output of the WPI sensor. In the preferred embodiment, daylight sensor 140 is a near-IR sensor, such as that disclosed in U.S. Pat. No. 6,084,231, which directly senses the daylight admitted by shading device 110 while ignoring visible-spectrum illumination produced by artificial lighting. The output of such a sensor can also be used to determine the day/night state, i.e. by one-bit-quantizing the sensor output.

The configuration of shading device 110, controller 120, user interface 130, and daylight sensor 140 is functionally equivalent to an embodiment of the closed-loop daylight control system disclosed in U.S. Pat. No. 6,084,231. Like the system disclosed therein, system 100 can automatically adjust window shading to maintain a user-set daylight setpoint. Practitioners may refer to that disclosure for additional implementation details.

System 100 also includes two interfaces to external devices or systems: a conventional low-level interface 150 and a conventional high-level interface 160.

Low-level interface 150 is an interface which does not require a layered protocol and therefore avoids IT overhead and cybersecurity risks while also minimizing potential incompatibilities with other systems. It can be, e.g., a hardwired discrete, parallel, or serial interface, and it may be a unidirectional interface in which information is received but not transmitted by controller 120. In the preferred embodiment, low-level interface 150 is a two-bit discrete interface that enables controller 120 to receive two bits of information encoded as voltage levels, and also to determine if an external device is, in fact, connected to the interface. Low-level interface 150 is described in more detail below.

High-level interface 160 is a network interface implementing a layered protocol that enables system 100 to be networked with other systems. High-level interface 160 is described in more detail below.

Conventional Elements Omitted from FIG. 1

Conventional elements incidental to the essence of the invention, or which would be familiar to practitioners in the art, are omitted from FIG. 1 for the sake of clarity. These include, e.g., a power supply or voltage regulator.

Figure 2A:
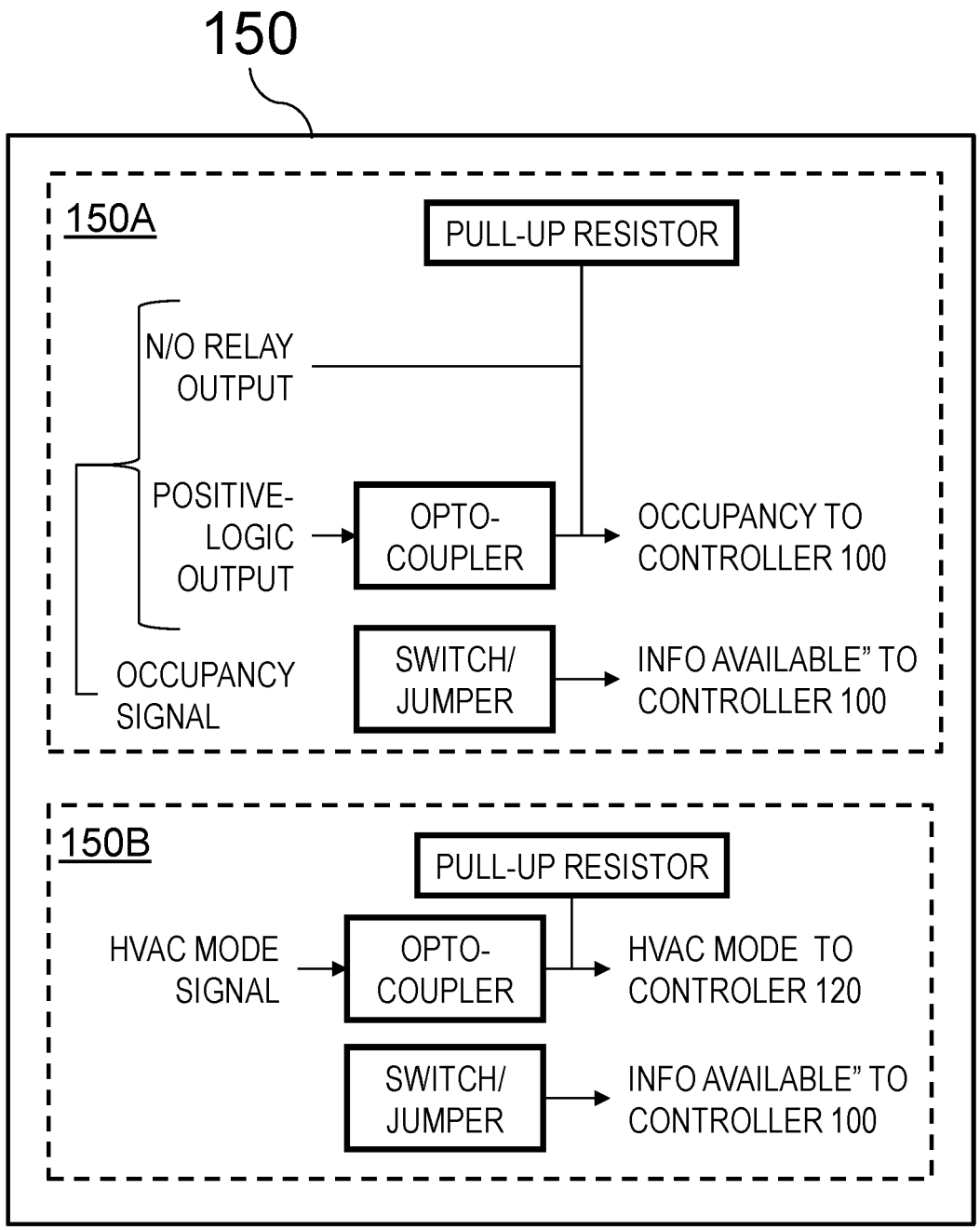
FIG. 2A is a block diagram of a low-level interface of the preferred embodiment.

FIG. 2A: Low-Level Interface 150

Low-level interface 150 is capable of accepting at least two bits of information. As previously stated, these two bits of information are an occupancy bit and an HVAC mode bit. The occupancy bit indicates whether or not the area shaded by shading device 110 is occupied, while the HVAC mode bit indicates the current mode (heating versus cooling) of the HVAC system.

These bits could be provided by an external Building-Management System (BMS) that has a programmable I/O module. For example, they could be provided by a BACnet-to-discrete bridge module that has TTL-level logic outputs.

Alternatively, these bits could be provided by separate sensors or devices. At the time of this disclosure, there appears to be little standardization in how, or if, HVAC mode signals are made available by HVAC control systems. On the other hand, there appears to be substantial standardization in the occupancy signals produced by occupancy sensors. It appears that most off-the-shelf and legacy occupancy sensors offer either low-voltage DC outputs, open-contact relay outputs, or both DC and open-contact relay outputs. Low-voltage DC outputs are typically positive-logic signals, i.e. a high logic level (typically 24-VDC) indicates occupancy. Sensors that provide open-contact relay outputs typically provide both Normally-Open (NO) and Normally-Closed (NC) contacts.

As previously stated, controller 120 must also be able to determine if information from external devices is, in fact, available on low-level interface 150. This requires two additional bits of information, one of which represents the availability of occupancy information and one which represents the availability of HVAC mode information. This information can be provided by jumpers or switches that are set to the appropriate setting when external devices are connected to (or disconnected from) low-level interface 150.

Thus, low-level interface 150 accepts two bits of information from external sources, and provides four bits of information (including the two availability signals set via jumpers or switches) to controller 120.

FIG. 2A provides a block diagram of an embodiment of low-level interface 150. For the sake of clarity, the diagram omits conventional elements, e.g. signal ground connections, which would be familiar to practitioners in the art. Interface 150 includes two single-bit input channels 150A and 150B, and produces four discrete outputs which in turn are connected to inputs of controller 120.

Channel 150A accepts either a logic-level or an open-contact relay output that represents occupancy, and is therefore compatible with conventional occupancy sensors as well as with discrete outputs from a BMS system. The logic-level signal is applied to a conventional optocoupler circuit in which the input and load (pull-up) resistors are chosen so that the optocoupler output stage saturates for voltages greater than about 2V, and so that the input stage can handle voltages up to about 30V. This enables the system to accept signals with logic "high" voltages ranging from 3.3V to 24V with a comfortable safety margin. The open-contact relay input is connected to the optocoupler's pull-up resistor. This circuit is designed to accept positive-logic signals (i.e. signals in which a high logic level or a closed relay represents occupancy), as produced by typical occupancy sensors. Of course, an additional input channel could be added to accommodate sensors which produce negative-logic signals.

Channel 150A also includes a switch or jumper (a switch is preferred) connected to an input of controller 120 which has in internal pull-up resistor. The switch is closed (or the jumper inserted) when a source of occupancy information is connected to channel 150A. This enables controller 120A to ascertain the availability of occupancy information on low-level interface 150.

Channel 150B accepts a logic-level signal that represents the prevailing HVAC mode, which could be provided via a discrete output from a BMS. Channel 150B is identical to channel 150A, except that it does not include an input for a relay-contact output.

Thus, low-level interface 150 can accept occupancy and HVAC mode information from an occupancy sensor and a BMS, and because it uses a discrete point-to-point connection without a layered protocol, presents no IT support overhead, cybersecurity, or interoperability risks. Further, it is compatible with virtually all occupancy sensors and (via an appropriate I/O module) all Building-Management Systems.

Figure 2B:
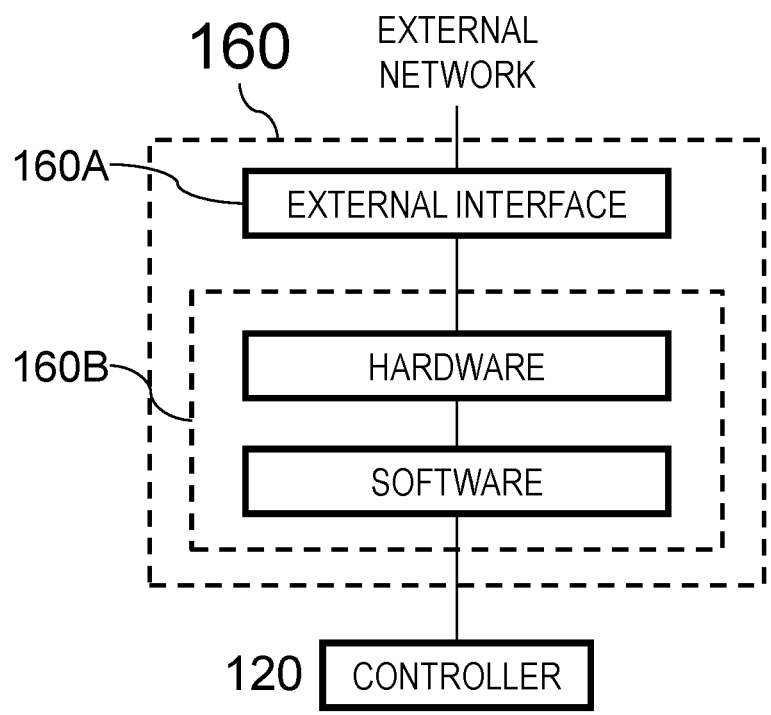
FIG. 2B is a block diagram of a high-level interface of the preferred embodiment.

FIG. 2B: High-Level Interface 160

High-level interface 160 is intended to enable system 100 to be fully integrated with other devices and systems. Per the current trend in the art, this requires a high-level network interface with multiple abstraction layers. For example, the Open Systems Interconnection (OSI) network interface model defines seven abstraction layers, ranging from the low-level physical and electrical layers up to the application layer. The lower levels are typically implemented in hardware, while the higher levels are typically implemented in software (including firmware). The software implementation of higher-level layers is often referred to as a protocol stack.

However, as previously stated, the market has not yet settled on standards for such integration, nor on approaches for ensuring the security of such integrated systems against cyber threats. This creates near-term risks for automated shading systems intended to provide the benefits of integration with other systems.

One way of mitigating these risks is to commit only to technologies at the lower layers of abstraction (e.g. just the physical layer), because networking technology evolves more slowly at the lower layers than at the higher (e.g. application) layers. Support can then be provided for specific higher-layer technologies via in-the-field software/firmware upgrades.

Unfortunately, such an approach is hampered by the fact that the different market segments for automated shading systems, e.g. the residential luxury market, the residential mainstream market, and the commercial buildings market, are currently tending toward different technologies at the lower levels of abstraction. This could be mitigated by providing support for multiple lower-layer technologies (e.g. IEEE 802.3, 802.11, and 802.15) "out of the box", but this would obviously increase cost.

Another approach is to initially omit hardware associated with high-level interface 160 in favor of retrofitting it later in the field.

In the preferred embodiment, different variants of high-level interface 160 are provided for different target markets. This is accomplished by implementing high-level interface 160 as a module which can be distributed either with, or separately from, the other elements of system 100. Purchasers can choose a module compatible with a particular network standard at the time of purchase, or elect to postpone purchase of the module until a later date, or can replace an originally-selected module with one that supports a different standard.

FIG. 2B shows a block diagram of such a module implementing the preferred embodiment of high-level interface 160. It consists of an external interface 160A and a protocol bridge 160B. Per the layer definitions of the OSI model referenced above, external interface 160A implements the lower layers (e.g. Physical layer 1 through Session layer 5) of an interface to an external network according to a desired standard, while protocol bridge 160B implements the higher layers of the interface to the external network, as well as an interface to controller 120. Protocol bridge 160B includes both hardware and software. Depending on the type of external network to be interfaced, the hardware may be shared with controller 120 or may be dedicated hardware in interface 160, and the software may run on controller 160, or on hardware included in interface 160, or on hardware included in both interface 160 and controller 120. Preferably, the hardware is shared with controller 120, so that no additional hardware is required in high-level interface 160.

The following paragraphs describe preferred embodiments of high-level interface 160 for the commercial-buildings and residential markets. However, it should be noted that, due to the rapid pace of technological evolution in this area, these embodiments may be quickly rendered obsolete:

- For the commercial-buildings market, external interface 160A consists of a physical/electrical interface to a BACnet MS/TP network. It includes a terminal block that accepts a twisted-pair cable and an RS-485-to-TTL transceiver, with the RS-485 side connected to the terminal block. Protocol bridge 160B includes hardware in controller 120 (specifically a hardware UART connected to the TTL side of the RS-485-to-TTL transceiver of external interface 160A). It also includes software running on controller 120 that implements a BACnet protocol stack and a translation engine that enables controller 120 to interpret and respond to BACnet messages on the external network.
- For the residential market, one variant of external interface 160A consists of a ZigBee module which includes an RF transceiver and a controller that implements a ZigBee protocol stack and also has a TTL UART port. Protocol bridge 160B includes hardware in controller 120 (specifically a hardware UART connected to the UART of external interface 160A). It also includes software running on controller 120 that enables controller 120 to interpret and respond to ZigBee messages on the external network. This variant of external interface 160A may also be able to support the commercial-buildings market using the emerging BACnet-over-ZigBee standard.
- For the residential market, another variant of external interface 160A consists of a WiFi module which includes an RF transceiver and a controller that implements a WiFi protocol stack and also has a TTL UART port. Protocol bridge 160B includes hardware in controller 120 (specifically a hardware UART connected to the UART of external interface 160A). It also includes software running on controller 120 that enables controller 120 to interpret and respond to WiFi messages on the external network. The above variants of high-level interface 160 can be implemented by simply changing external interface 160A and the software in controller 120 that implements protocol bridge 160B.

FIGS. 3-6: Operating Steps of Preferred Embodiment

FIGS. 3-6 show flowcharts of the operating steps of the preferred embodiment. They consist generally of the steps of selecting a mode of operation (shown in FIG. 3) and determining and providing the shading setting appropriate for the prevailing mode of operation (shown in FIGS. 4-6 for the thermal management, preferred-setting, and daylighting modes, respectively), based on the hierarchy of benefits outlined above.

Figure 3:
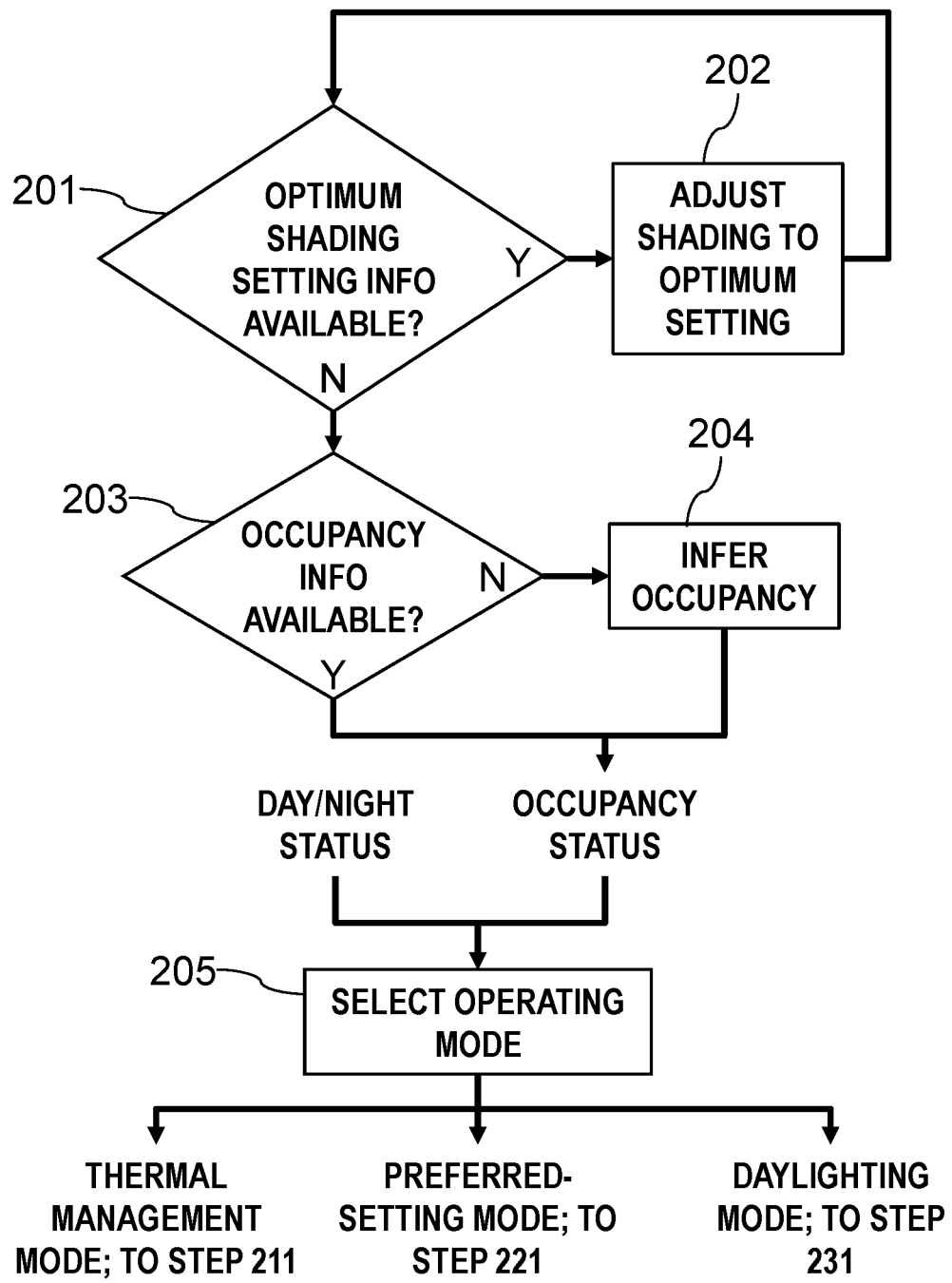
FIG. 3 is a flowchart of operating steps associated with selecting an operating mode of the preferred embodiment.

FIG. 3: Selecting the Operating Mode

In a decision step 201, controller 120 checks high-level interface 160 to determine if an optimum shading setting is available from an external source (e.g. a Building Management System). In order for a command to be available, another system or network must be actually connected to system 100 via high-level interface 160, and have actually determined the optimum shading setting and communicated it to interface 160. In order to determine the optimum shading setting, the external system could require information from system 100, e.g. the setting of shading device 110 or the output of daylight sensor 140, via interface 160. If an optimum shading setting is, in fact, available via the interface, then controller 120 executes an adjustment step 202, in which it adjusts shading device 110 to the optimum setting (if not already at the optimum setting). In performing this step, system 100 is effectively ceding control to the external system.

However, if an optimum setting is not available (e.g. if no external system or network is actually connected to high-level interface 160), then controller 120 selects an operating mode. As previously noted, this requires two bits of information:

- an occupancy bit whose two values correspond to the windowed space being occupied and unoccupied, and
- a daytime bit whose two values correspond to daytime and nighttime.

Therefore, in a decision step 203, controller 120 checks low-level interface 150 and high-level interface 160 to see if occupancy information is available. If occupancy information is available, controller 120 sets or resets the value of the occupancy bit based on the highest ranked source of occupancy information (which could be the BMS) and proceeds to a selection step 205. Otherwise, an inference step 204 is performed in which the occupancy state is inferred:

- As noted in the previously outlined hierarchy of benefits, occupant satisfaction is the most important criterion of effective automated shading. For this reason, the risk of failing to detect actual occupancy is much greater than the risk associated with "false positives", i.e. incorrectly assuming occupancy. Thus, if occupancy information is not available via interfaces 150 or 160, controller 120 can simply assume occupancy (i.e. it can set the internal occupancy variable) without significant degradation in the net benefit provided by system 100.
- Alternatively, other information, if available, could be used to infer occupancy. For example, a real-time clock connected to controller 120 could be used to infer occupancy in an office building on the basis of an established work schedule. As another example, occupancy could be inferred from the state of the lighting system, e.g. via a flicker sensor (as disclosed in U.S. Pat. No. 5,598,000) connected to controller 120.

Selection of the operating mode also requires the daytime bit of information. In the preferred embodiment, this is obtained by thresholding (i.e., one-bit-quantizing) the output of daylight sensor 140. Alternatively, the value of the daytime bit could be determined via a real-time clock/calendar, or via an external photocell (e.g. connected directly to controller 120 or via an expanded version of low-level interface 150), or even from the internet via high-level interface 160.

After the values of the occupancy and daytime bits are established, a selection step 205 is performed in which the operating mode is selected.

Consistent with the hierarchy of benefits outlined above, the following algorithm is used to select the operating mode:

If the occupancy bit is reset, the thermal management mode is selected.

Otherwise, if the occupancy bit is set and the daytime bit is also set, then the daylighting mode is selected.

If the occupancy bit is set but the daytime bit is reset, then the preferred-setting mode is selected.

Operation then branches to a step that depends on the selected operating mode: step 211 for the thermal management mode, step 221 for the preferred-setting mode, and step 231 for the daylighting mode.

Figure 4:
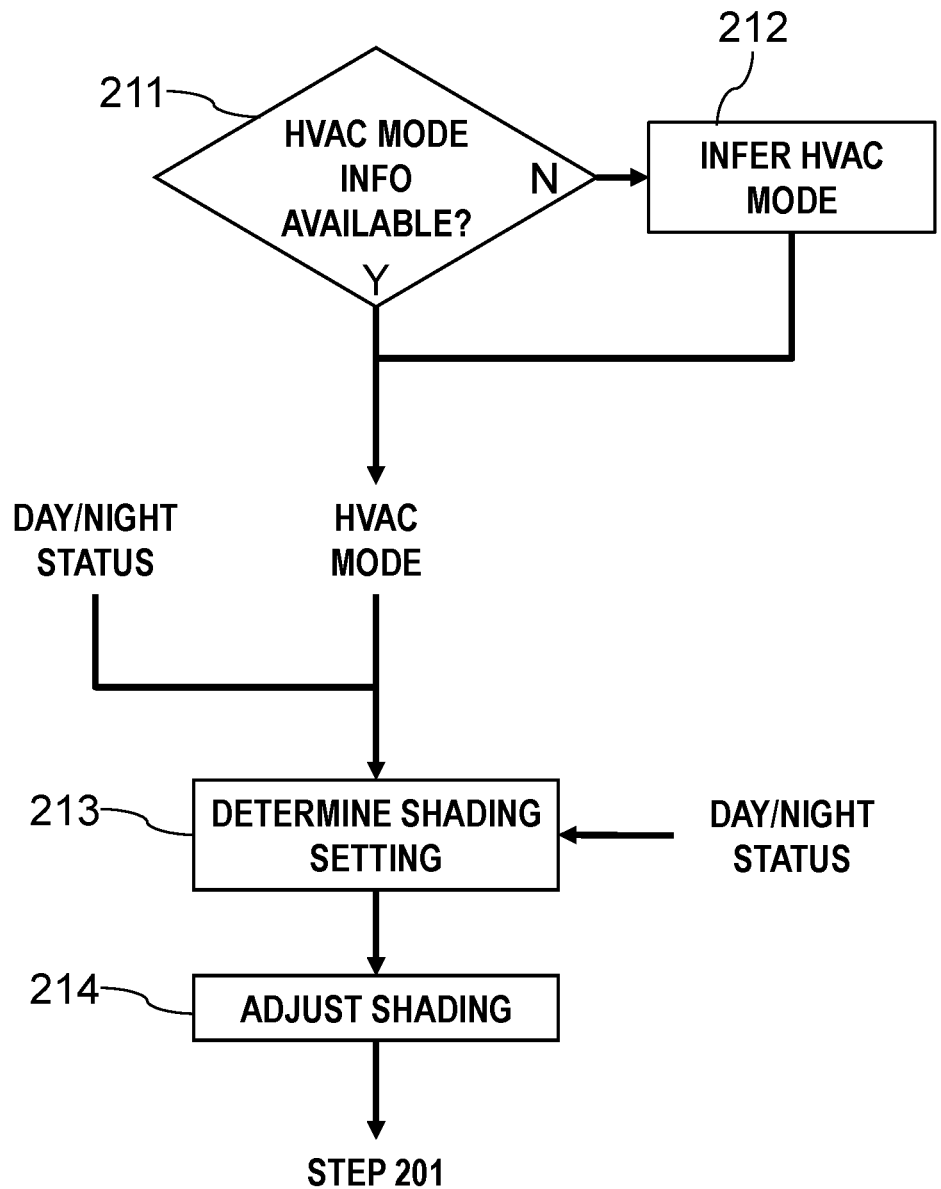
FIG. 4 is a flowchart of operating steps associated with a thermal management mode of the preferred embodiment.

FIG. 4: Thermal Management Mode

As noted previously, per the benefits hierarchy, the thermal management mode is engaged when the occupancy bit is reset, i.e. when the shaded space is not occupied. Thus, occupant preferences, glare, or need for illumination need not be considered in the shading adjustments, which can be aimed solely at minimizing thermal loads on the HVAC system.

FIG. 4 depicts the operating steps in the thermal management mode. They begin with a decision step 211 of checking if HVAC mode information is available on low-level interface 150 or high-level interface 160. The method of checking for the availability of HVAC mode information on high-level interface 160 will depend on the specifics of that interface. Checking for the availability of HVAC mode information on low-level interface 150 involves controller 120 checking the "info available" bit of channel 150B of FIG. 2A. If HVAC mode information is not available on either interface, then operation proceeds to an inference step 212 in which the HVAC mode is inferred. Step 212 will be described in more detail in a subsequent section.

Otherwise, if the HVAC mode information is available from either source, the HVAC mode bit is set to either Heating or Cooling based on information from the highest-ranked source (which typically will be high-level interface 160).

Thereafter, a determination step 213 is performed in which the required shading setting is determined. This will be either the fully closed or fully open settings as a function of the HVAC mode and daytime bits:

The fully open setting is selected in the heating mode during daytime and in the cooling mode during nighttime.

The fully closed setting is selected in the heating mode during nighttime and in the cooling mode during daytime.

Alternatively, the required shading setting can be determined using temperature information. This method is described in more detail elsewhere herein.

Then, in an adjustment step 214, controller 120 adjusts shading device 110 to the required setting (if not already at the required setting). Thereafter operation branches back to step 201 of FIG. 3.

Step 212

As previously stated, step 212 involves inferring the HVAC mode. With the hardware configuration of FIG. 1, this can be done in at least two ways, with differing impacts on the expected energy savings provided by the thermal management mode. The ways in which the HVAC mode can be inferred can be further increased, with greater energy savings, by adding hardware to system 100 (as described in a subsequent section herein) and/or using information from external sources. As with automated shading benefits in general, the subject invention selects a way of inferring the HVAC mode on the basis of an assumed hierarchy of expected energy savings. Some of the ways in which the HVAC mode can be inferred are as follows, in order of increasing expected energy savings:

1. The HVAC mode can simply be inferred as the one which dominates annual HVAC operation in the prevailing building. For example, this would be the heating mode in a building in Minneapolis, MN, USA and the cooling mode in San Diego, CA, USA.
2. A substantial increase in expected energy savings can be achieved by inferring the HVAC mode on the basis of the length of the day, which in turn can be used to infer the season. The length of the day can be determined using the hardware configuration of FIG. 1 by measuring the time between changes in the value of the daytime bit (as determined by the output of daylight sensor 140). The length of the day can then be compared to a threshold to infer the current season and, hence, the cooling mode; if the threshold is exceeded, the cooling mode is inferred; otherwise the heating mode is inferred. The threshold would, of course, depend on the latitude of the host building. This method has the advantage of increasing the expected energy savings without need for additional hardware (e.g. a real-time clock/calendar) over the configuration of FIG. 1.
3. The HVAC mode could be inferred from information obtained via high-level interface 160 from a source other than the HVAC system. For example, if high-level interface 160 is connected to a weather server on the internet, the HVAC mode could be inferred from recent, current, and near-term predicted future temperatures, time-averaged over an interval (e.g. a day or two) that accounts for the building's thermal mass. This method offers greater expected energy savings but requires external connectivity.

The preferred embodiment uses method 2 listed above. In alternative embodiments, however, it could implement an algorithm which selects whichever of methods 1-3 are supported by the current hardware configuration and which yields the greatest energy savings. Such an algorithm would involve checking for the presence of daylight sensor 140, temperature sensors, and temperature/weather information on high-level interface 160, then then inferring the HVAC mode according to a predetermined hierarchy of expected energy savings such as the one outlined above.

After completion of step 212, operation proceeds to previously-described step 213.

Figure 5:
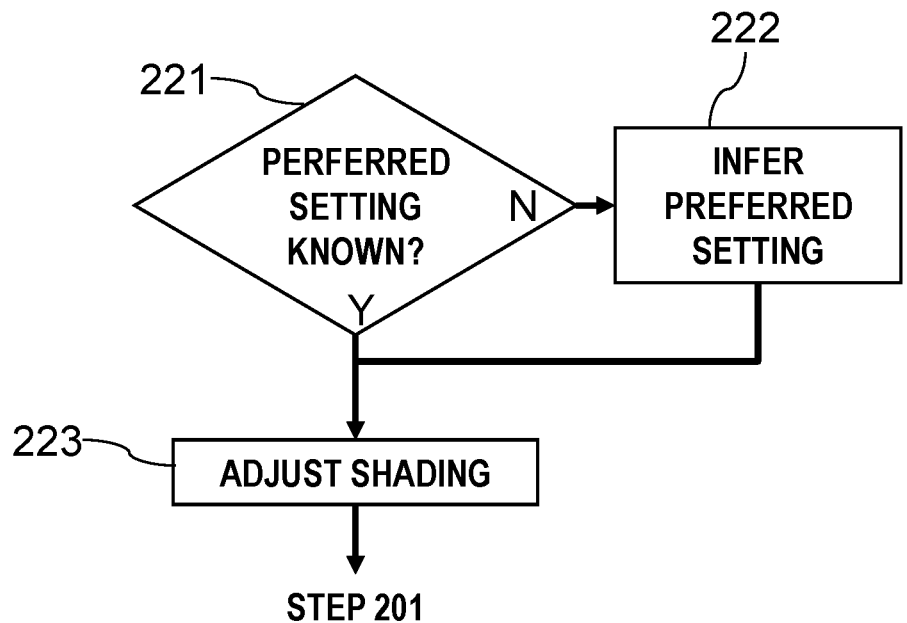
FIG. 5 is a flowchart of operating steps associated with a preferred-setting mode of the preferred embodiment.

FIG. 5: Preferred-Setting Mode

As noted previously, the preferred-setting mode is engaged when the occupancy bit is set and the daytime bit is reset (i.e. when the space is occupied at nighttime). FIG. 5 depicts the operating steps in the preferred-setting mode. They begin with a step 221 of checking if the occupants' preferred setting is known. Controller 120 does this by checking the contents of a memory to see if a preferred setting has been programmed into the system. For reference, a system for learning and storing preferred settings, and determining if such settings have been stored, is disclosed in U.S. Pat. No. 7,941,245. The system disclosed therein is compatible and synergistic with the subject invention.

If a preferred setting has not been programmed into the system, then an inference step 222 is performed; otherwise an adjustment step 223 is performed.

In inference step 222, the system infers the occupants' preferred setting for the prevailing conditions (i.e. at nighttime). With the hardware configuration of FIG. 1 and absent any information on high-level interface 160, the safest inference is that the shading should be fully closed in order to provide privacy, and this is the approach used in the preferred embodiment.

However, as with inferring the HVAC mode, the occupants' preferred shading setting can be more reliably inferred with additional information. Specifically, occupants' preferred shading settings at nighttime typically depend on the state of the artificial lighting system: if the lights are on, occupants often prefer closed shading for privacy; if the lights are off, occupants are more likely to prefer open shading. Low-level interface 150 could be expanded to include a discrete interface to the lighting system to determine the state of the room lights; alternatively, an artificial lighting sensor such as the flicker sensor disclosed in U.S. Pat. No. 5,598,000 could be included in system 100 to sense the lighting state. As with the thermal management mode, an alternative embodiment of system 100 could check for the presence of lighting state information; if unavailable, it could infer the fully closed setting; otherwise, it could infer the preferred setting on the basis of the lighting state.

Then, after the preferred setting is established, adjustment step 223 is performed in which controller 120 adjusts shading device 110 to the preferred setting (if not already at the required setting). Thereafter operation branches back to step 201 of FIG. 3.

Figure 6:
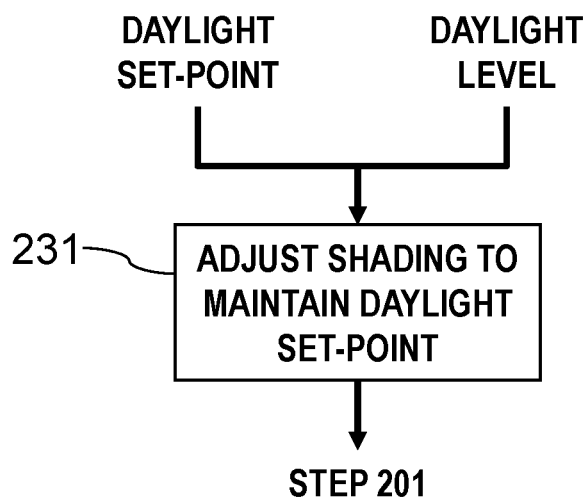
FIG. 6 is a flowchart of operating steps associated with daylighting mode of the preferred embodiment.

FIG. 6: Daylighting Mode

As noted previously, per the benefits hierarchy, the daylighting mode is engaged when both the occupancy and daytime bits are set. Its purpose is to maintain the occupants' preferred daylight level, and thereby maximize occupant satisfaction while also saving energy through daylighting.

The daylighting mode involves a single step, step 231, in which controller 120 adjusts shading device 110 to maintain a daylight set-point on the basis of the daylight level sensed by daylight sensor 140. This could be done in either open-loop or closed-loop fashion; the preferred embodiment uses closed-loop control:

Daylight sensor 140 is located and oriented to sense daylight admitted by shading device 110.

Controller 120 registers the output of daylight sensor 140, compares it to an occupant-determined set-point, and adjusts shading device 110 to minimize the difference between the set-point and the sensed daylight level. Occupants can adjust the set-point via user-interface 130, e.g. by manually adjusting the shading until the desired daylight level is reached.

The above-described closed-loop daylighting mode is functionally equivalent to the operation of a system disclosed in U.S. Pat. No. 6,084,231, to which practitioners are referred for additional implementation details.

After the shading has been adjusted to maintain the daylight set-point, operation branches back to step 201 of FIG. 3.

Figure 7A:
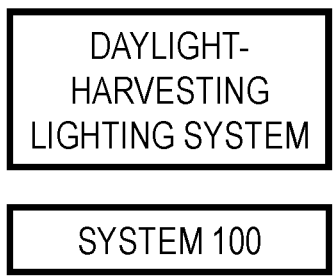
FIGS. 7A-7D are block diagrams of various ways of deploying the preferred embodiment.
Figure 7B:
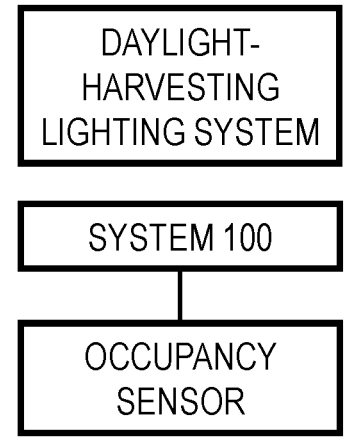
Figure 7C:
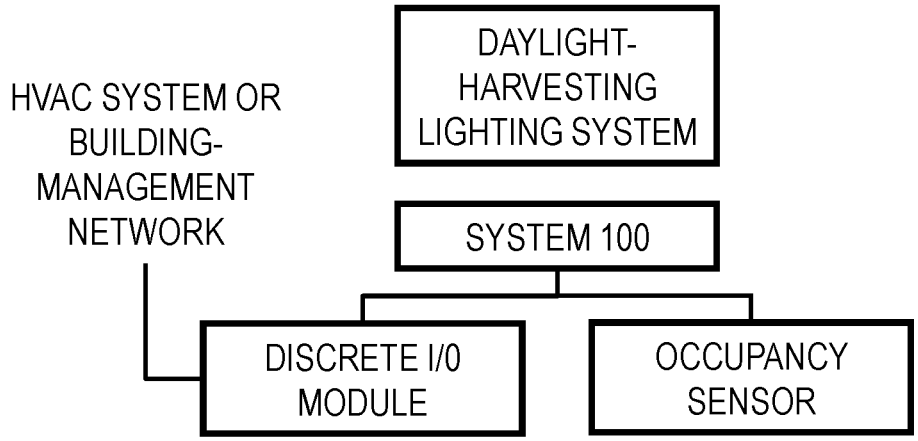
Figure 7D:

FIGS. 7A 7D: Deployment of System 100

System 100 can be deployed in at least four ways and hybrids thereof.

In the first way, it can be deployed as an autonomous system without any connections to low-level interface 150 or high-level interface 160. Such a configuration is shown in FIG. 7A. In this autonomous configuration, the system assumes that the area shaded by shading device 110 is always occupied, and the system is capable of closed-loop daylight control (i.e. via the daylighting mode) and also of automatically providing occupants' preferred shading setting at nighttime. Testing shows that such a fully autonomous capability is sufficient to provide a high level of occupant satisfaction. Further, if shading device 110 shades an area that is illuminated by a daylight-harvesting lighting system (as shown in FIG. 7A), then this capability also provides substantial energy savings, particularly in older office buildings with relatively high installed Lighting Power Densities (LPDs). Thus, when used with an inexpensive stand-alone daylight-harvesting lighting control, system 100 provides an extremely cost-effective way to save energy in older office buildings.

In the second way, low-level interface 150 can be connected to an occupancy sensor as shown in FIG. 7B. Occupancy sensors are considered to be highly cost-effective for saving energy in office buildings, so newer buildings, and energy-saving retrofits to older buildings, almost always include them. Connecting system 100 to an occupancy sensor via low-level interface 150 does not entail any IT support overhead or cybersecurity risks, and low-level interface 150 is compatible with virtually all occupancy sensors. When connected to an occupancy sensor, system 100 automatically engages the thermal management mode when appropriate, saving energy by reducing loads on the HVAC system. Ideally, when connected to an occupancy sensor, system 100 would also be used in conjunction with a daylight-harvesting lighting system (as shown in FIG. 7B), in order to also provide savings via daylighting.

In the third way, as shown in FIG. 7C, system 100 can be connected to both a source of occupancy information and a source of HVAC mode information via low-level interface 150. As shown in the block diagram, the HVAC mode information would typically come from a discrete I/O module connected to a building-management network, such as BACnet or Modbus. The occupancy information could come from either an occupancy sensor as shown, or, as with the HVAC mode information, from a building-management network via a discrete I/O module. Interfacing to low-level interface 150 via discrete signals in this way bypasses many of the issues and risks associated with connecting system 100 directly to a building-management network via a high-level interface 160:

There are currently many competing lower-layer technologies for building-management networking. Connecting to a building-management network via discrete signals postpones the need to commit to a particular lower-layer technology.

There are currently no agreed-upon standards at the higher-layer levels for integrating automated shading with building-management systems. Connecting to a building-management system via discrete signals bypasses the need for such standards.

Connecting via discrete signals eliminates any additional IT support overhead or cybersecurity risks (beyond those associated with the building-management network) due to system 100.

Further, due to the hierarchies implemented in its operating steps as described above, connecting system 100 in this way provides most (if not virtually all) of the benefit of full integration via high-level interface 160.

In the fourth way, shown in FIG. 7D, system 100 is fully integrated with a building-management system by directly connecting to the building-management network via high-level interface 160. Presumably, this would be done only after the market settles on preferred standards, technologies, and approaches for whole-building integration.

It is envisioned that an instance of system 100 could be used in all of these ways, beginning with fully autonomous operation, then later adding connectivity via low-level interface 150, and then finally adding network connectivity via high-level interface 160.

It is also envisioned that different instances of system 100 would be used in each of these different ways, depending on the presence or absence of occupancy sensors and building-management systems/networks in the host buildings.

Advantages

From the preceding discussion, it will be evident to practitioners that system 100 is capable of operating autonomously, in a partially integrated manner with external systems or devices connected via low-level interface 150, and in a fully integrated manner via systems or devices connected via high-level interface 160. Further, the hierarchies incorporated in its shading protocol enable it to automatically adapt to each level of integration—and to varying types and quality of information from external sources—while maximizing the net automated shading benefit.

As described above, this enables a single instance of system 100 to support increasing levels of integration, allowing it to maximize the automated shading benefit it provides while minimizing the risks associated with integration. It also enables a single design of system 100 to meet the diverse needs of the current market.

Alternative Embodiments

Practitioners will appreciate that various alternative embodiments of the subject automated shading system and method are possible, and may be advantageous in certain applications, without departing from the spirit and scope of the subject invention.

Alternative Hardware Configurations

The concept of benefits and information hierarchies disclosed herein is intended to enable an automated shading system to adapt to varying amounts and types of information, and thereby inherently supports various hardware configurations.

Therefore, while the block diagram shown in FIG. 1 represents what is currently believed to be the most cost-effective configuration of system 100, the invention disclosed herein would still be advantageous if hardware elements are added to, or removed from, system 100.

For example, the following elements could be added:

- A Passive Infra-Red, ultrasonic, or dual-technology occupancy sensor could be included in system 100. The output of such an organic (i.e. within system 100) occupancy sensor could be used directly to determine the value of the occupancy bit in step 203 of FIG. 3. However, depending on the type and orientation of the sensor, its output could rank lower in the information hierarchy than the output of an external occupancy sensor; in that case, per the subject invention, the system would preferentially use the output of an external sensor (obtained via low-level interface 150) if available; otherwise, the system would fall back to using the output of the organic sensor.
- A real-time clock/calendar could be included in system 100 and could be used to infer the values of the daytime bit and/or HVAC mode. A real-time clock would probably rank lower in the information hierarchy than a daylight sensor for determining the value of the daytime bit, because the latter would account for weather.
- A temperature sensor could be included in system 100 to measure the exterior air temperature. The output of such a sensor (potentially time-averaged to account for the building's thermal mass) could be used to infer the HVAC cooling mode, and would probably rank relatively highly in the information hierarchy for that purpose. However, adding such a sensor would require penetrating the envelope of the building, and it would probably not be cost-effective to include such a sensor for each instance of shading device 110; rather, it would likely make more sense to share external temperature information across a network via high-level interface 160.
- A temperature sensor could be included in system 100 to measure the interior temperature on the window side of shading device 110. This temperature and the nominal room temperature could be used to determine the thermal gradient across the window, which in turn could be used to determine the optimum shading setting in the thermal management mode. This is described in more detail below.
- Low-level interface 150 could be expanded to accept additional channels of discrete information. For example, a channel could be added to accept lighting state (on/off) information from a lighting system, which could then be used in determining the shading setting in the preferred-setting mode. As another example, channels could be added to detect the presence of external devices, eliminating the need for switches/jumpers to indicate the availability of information from external sources.
- Low-level interface 150 could be a parallel, serial, or other type of interface that does not require a complex protocol. For example, it could be a narrow e.g. two-bit or four-bit) proprietary parallel interface, although such an interface is unlikely to be advantageous. A more practical example would be a Modbus serial interface.
- Multiple low-level interfaces could be used (e.g. a discrete interface per the preferred embodiment plus a Modbus interface).
- Multiple high-level interfaces 160 could be used, each adhering to a different standard. For example, system 100 could include interfaces compatible with the IEEE 802.3, 802.11, and 802.15 standards.

Similarly, elements could be removed without deviating from the scope and spirit of the invention, e.g.:

- User interface 130 or daylight sensor 140 could be omitted and their functionality provided instead by other devices accessible via high-level interface 160.
- Because the system disclosed herein explicitly accounts for the presence or absence of information on interfaces 150 and 160, either of those interfaces could be omitted without deviating from the scope and spirit of the invention.

Further, the scale of system 100 could vary. As shown in FIG. 1, system 100 includes a single shading device 110. However, practitioners will appreciate that one or more elements of system 100 could be shared among more than one instance of shading device 110. For example, controller 120 could be used across many instances of shading device 110.

Figure 8A:
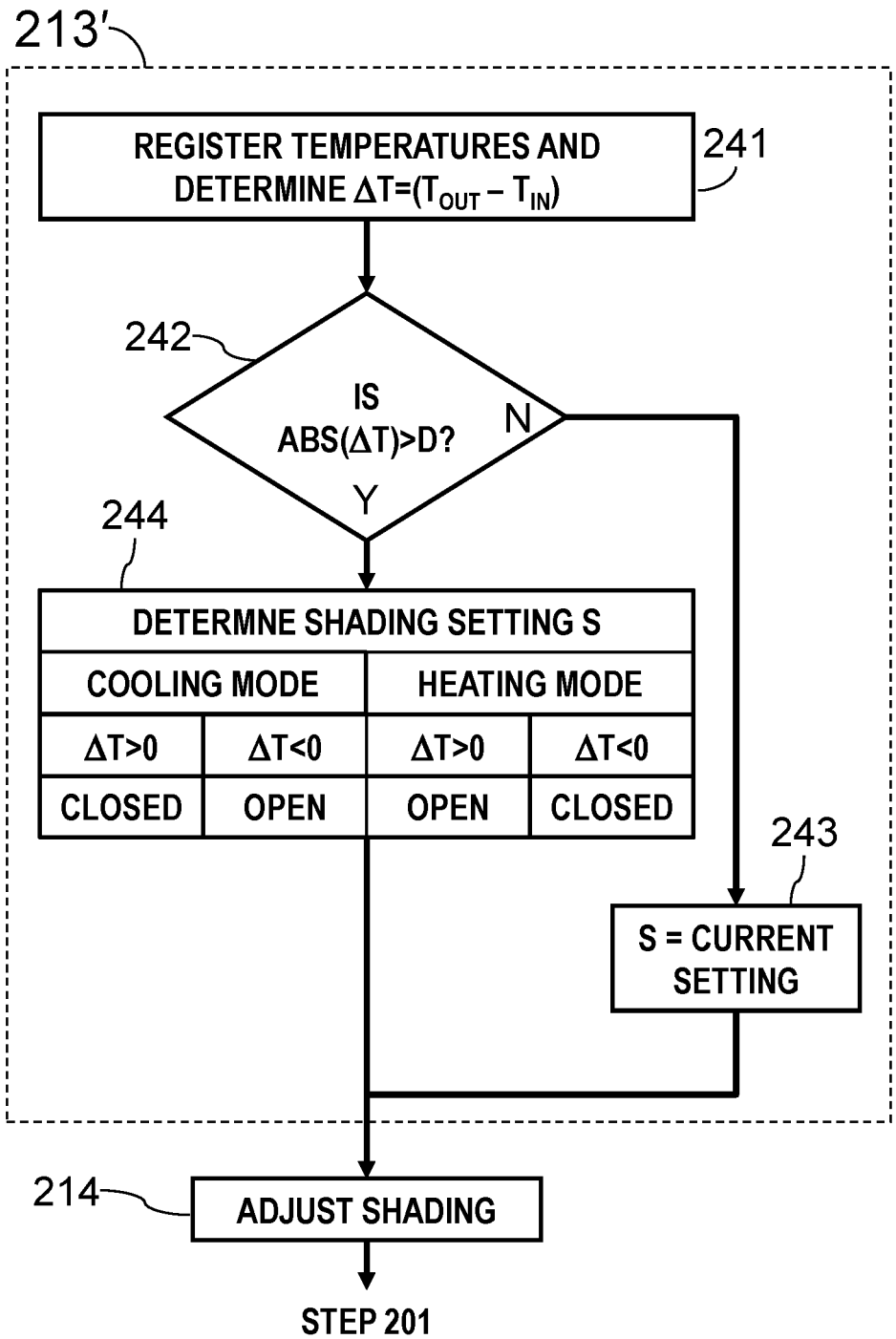
FIG. 8A is a flowchart of the operating sub-steps to determine a shading setting for the thermal management mode of an alternative embodiment of the subject invention.

FIG. 8A: Use of Thermal Gradient to Determine Required Shading Setting in Thermal Management Mode As mentioned above, a temperature sensor could be included in system 100 to measure the temperature on the window-side of shading device 110. This temperature, along with the nominal room temperature (e.g. obtained from another temperature sensor included in system 100, or from the HVAC system via high-level interface 160), could be used to determine the thermal gradient across shading device 110, which in turn could be used to determine the shading setting for the thermal management mode (i.e. as in step 213 of FIG. 4).

FIG. 8A shows an alternative implementation of determination step 213, a determination step 213', that exploits the sensed thermal gradient to determine the required shading setting S for the thermal management mode. It includes the following sub-steps:

In a registering step 241, the temperature on the window-side of the shading device $T_{OUT}$, and the nominal room temperature $T_{IN}$, are registered by controller 120, and the thermal gradient $\Delta T$ is determined by subtracting $T_{IN}$ from $T_{OUT}$.

In a decision step 242, the absolute value of the thermal gradient $\Delta T$ is compared to a deadband value D. If the absolute value does not exceed the deadband value, then an equating step 243 is performed, in which the shading setting S for the thermal management mode is set to the current shading setting. Then adjustment step 214 of FIG. 4 is performed, which does not result in a shading adjustment because S is equal to the original setting.

If in decision step 242, however, the thermal gradient does exceed the deadband D, then a determination step 244 is performed in which the shading setting S is determined as a function of the HVAC mode and the sign of the thermal gradient $\Delta T$. As shown in the Figure, the setting is either fully closed or fully open.

This approach will save more energy than the baseline approach of step 213 of FIG. 4, because it adjusts the shading on the basis of the expected instantaneous heat flux through the shading device (as inferred from the thermal gradient), rather than just on the basis of the daytime bit. It also has the advantage of accounting for differences in insolation and shading from window to window and from façade to façade. However, it has the disadvantage of requiring a window-mounted temperature sensor, as well as room temperature information.

Alternative Approaches for Inferring Direction of Heat Flux

As described above, the direction of heat flux across a shading device can be inferred from the difference between the room temperature and the temperature on the window-side of the shading device. This difference will be greatest when the window-side temperature sensor directly senses the temperature outside the window (e.g. with a temperature sensor affixed to the outside surface of the window), which will yield the greatest sensitivity in inferring the direction of heat flux.

Alternatively, the direction of heat flux could also be inferred from the difference between the room temperature and the temperature proximal to the shading device but on the room-side, rather than on the window-side, of the shading device. Due to the reduced temperature difference, this approach will be less sensitive in inferring the direction of the heat flux than if the window temperature were used. This reduced sensitivity places a greater premium on the accuracy of the temperature measurement(s) in order to reliably infer the direction of heat flow. However, this approach may be easier to implement, because it enables the temperature sensor to be mounted on the shading device itself (rather than on the window or even outside the window), along with the other components of an automated shading system.

A key aspect of the above-discussed approaches is that the direction of heat flux across a shading device can be inferred from the difference between a first temperature and a second temperature, wherein:

the first temperature is closer to the room temperature than to the temperature at the window, and the second temperature is closer to the temperature at the window than to the room temperature.

These criteria can be met in several ways:

The first temperature can be the room temperature (e.g. the known or assumed set-point of an HVAC thermostat) and the second temperature can be the temperature on the window-side of the shading device, e.g. as in $T_{IN}$ and $T_{OUT}$, respectively, of FIG. 8A. In this case, the second temperature can be obtained via a temperature sensor mounted between the shading device and the window, on the window itself, or outside the window. However, note that a second temperature obtained with a sensor mounted outside the window will not necessarily meet the above criterion unless it is located close to the window. For the same reason, the outside air temperature obtained from a weather report may not meet the above criterion, because under certain conditions it may actually be closer to room temperature than to the temperature at the window (e.g. when the window is receiving direct sunlight).

The first temperature can be the room temperature and the second temperature can be the temperature on the room-side of the shading device, provided that the second temperature is closer to the temperature at the window than to the room temperature. As discussed above, such a second temperature can be obtained via a sensor mounted on the shading device.

The first temperature can be a temperature that is between room temperature and the temperature at the window (e.g. the first temperature can be obtained via a sensor mounted on the room-side of the shading device), provided that the second temperature is closer to the temperature at the window (e.g. the second temperature can be obtained by a sensor mounted between the shading device and the window, or on the window itself).

If the second temperature is greater than the first temperature, then the inferred direction of heat flux is into the room, i.e. the room can be inferred to be gaining heat from the external environment through the window and shading device. Conversely, if the first temperature is greater than the second temperature, then the inferred direction of heat flux is out of the room, i.e. the room can be inferred to be losing heat to the external environment.

As shown in FIG. 8A, the direction of heat flux can be inferred from the difference $\Delta T$ between the two temperatures, but it can also be inferred on the basis of the ratio of the two temperatures. For example, if the ratio of the second temperature to the first temperature exceeds a threshold, the room can be inferred to be gaining heat, whereas if the ratio is less than a threshold, the room can be inferred to be losing heat.

The greater the difference or ratio between the first and second temperatures for a given heat flux across the shading device, the more sensitive and reliable will be the inferred direction of heat flow.

A consideration in implementing any of the above approaches is the thermal stratification (i.e. temperature variation with height), if any, in the host building. If there is significant thermal stratification, then any difference in mounting height between the sensors used to obtain the first and second temperatures (or between an HVAC thermostat used to obtain the first temperature and a sensor used to obtain the second temperature) should be accounted for inferring the direction of heat flux.

For example, consider a scenario wherein the setpoint of an HVAC thermostat is used as the first temperature and a temperature sensor mounted on the room-side of a shading device is used to sense the second temperature. If the temperature sensor on the shading device is mounted closer to the ceiling than is the HVAC thermostat, then the difference between the second temperature and the first temperature will include the effects of thermal stratification, if any, as well as the difference due to heat flux into or out of the window. In this case, the effects of thermal stratification must be accounted for in the sensor processing in order to reliably infer the direction of heat flux. This can be done, e.g., by including a temperature offset in the calibration of the sensor mounted on the shading device, or it could be done by subtracting a stratification adjustment from $\Delta T$, e.g. in registering step 241 of FIG. 8A, or it could be done by comparing $\Delta T$ to a value other than zero in determination step 244 of FIG. 8A. A fixed stratification correction could be used, or the correction could be made as a function of the temperature reading.

Use of Assumed Instead of Actual Room Temperature

The preceding discussion makes reference to the room temperature (e.g. obtained from another temperature sensor included in system 100, or from the HVAC system via high-level interface 160, both shown in FIG. 1) to infer the direction of heat flux across the shading device. In many applications, the nominal room temperature can be based on an assumed value (e.g. 22 degrees Celsius), instead of the actual temperature, without significantly reducing the reliability of the inferred direction of heat flux.

Figure 8B:
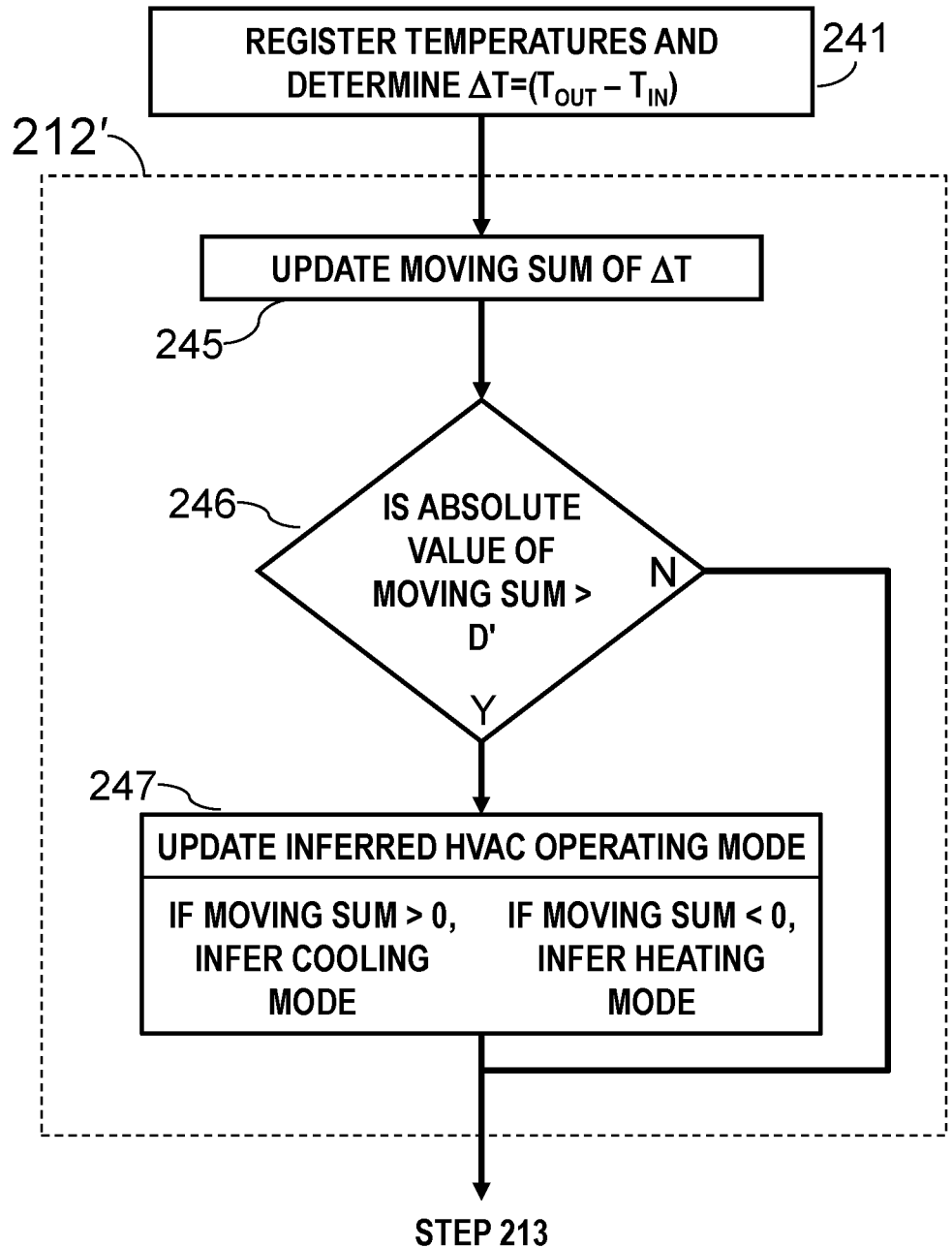
FIG. 8B is a flowchart of the operating sub-steps to infer the current HVAC mode of operation for the thermal management mode of an alternative embodiment of the subject invention.

FIG. 8B: Use of Inferred Heat Flux to Infer HVAC Operating Mode

In addition to enabling determination of the required shading setting in the thermal management mode (e.g. via determination step 213' of FIG. 8A), the inferred heat flux across shading device 110 can also be used to infer the HVAC mode (i.e. as a means of performing step 212 of FIG. 4). This is based on the observation that an HVAC system that is space-conditioning a perimeter zone should be operating in a mode that opposes the average heat flux into that zone over an interval comparable to that zone's thermal time-constant. For example, in a zone with a thermal time-constant of 24 hours, if the daily heat flux into the zone is negative, then the zone is losing heat to the external environment and the HVAC system for that zone should be in the heating mode. Conversely, if the daily heat flux into the zone is positive, then the zone is gaining heat from the external environment and the HVAC system for that zone should be in the cooling mode.

Thus, the desired (if not the actual) HVAC mode in a perimeter zone can be inferred on the basis of the sign of the time-averaged heat flux across a window in that zone (or, equivalently, the sign of the time-integrated heat flux across the window). If an automated shading system operates according to such an inferred HVAC mode, then it effectively operates as an independent virtual HVAC system which assists the actual HVAC system by opposing the average heat flux through the window. Such an automated shading system will reduce HVAC energy consumption even if the inferred HVAC mode does not match the actual HVAC mode. FIG. 8B shows an alternative implementation of inference step 212, an inference step 212', that exploits the time-integrated inferred heat flux to infer the HVAC operating mode. It includes the following sub-steps:

In a moving summation step 245, controller 120 (not shown in FIG. 8B) updates a moving sum (i.e. a sum of the previous N samples) of thermal gradient $\Delta T$ obtained in registering step 241. Because $\Delta T$ represents the relative heat flux inward through the window, the moving sum is a discrete-time approximation of the time-integral of the relative heat flux inward through the window.

The product of the number of samples N and the interval at which $\Delta T$ is sampled (i.e. the sampling interval) determines the duration of the summation "window" of the moving sum (i.e. the summation interval). The summation interval, in turn, determines the response time of the system in inferring the HVAC mode. A preferred embodiment uses a sampling interval of 1 hour and an N of 24, which yields a summation interval of 24 hours. The moving sum obtained in summation step 245 will therefore be proportional to the daily heat flux through the window, and its sign will represent the direction of the daily heat flux through the window. The 1 hour sampling interval is sufficiently short to sample the slowly varying thermal gradient in many buildings, while the 24-hour summation interval is thought to be comparable to the thermal time-constants of the perimeter zones of many building types The description of the subsequent sub-steps assumes that at least N samples have been accumulated in step 245, and that the inferred HVAC mode has been initialized (e.g. to the actual HVAC mode when system 100 of FIG. 1 is installed).

Next, in a decision step 246, the absolute value of the moving sum of $\Delta T$ is compared to a deadband value D'. If this absolute value does not exceed the deadband value, then the inferred HVAC operating mode is not updated (i.e. the previous inferred value is unchanged). The optimum value of D' will depend on factors such as the summation window duration, the accuracy of the temperatures (including any thermal stratification effects), the locations at which the temperatures are obtained (which determines the magnitude of $\Delta T$ for a given heat flux), and the desired sensitivity in inferring HVAC mode changes. A typical effective value is a few tenths of a degree Celsius.

If in decision step 246, however, the absolute value of the moving sum of $\Delta T$ does exceed the deadband D', then a decision step 247 is performed in which the HVAC mode is inferred from the sign of the moving sum of $\Delta T$. A positive moving sum would imply a net positive heat gain over the summation interval, so in that case the cooling mode would be inferred. Conversely, a negative moving sum would imply a net negative heat gain over the summation interval, which would result in the heating mode being inferred.

Thereafter determination step 213 of FIG. 4 is performed. As previously described, this could be done by performing step 213' of FIG. 8A, which is a way of implementing step 213.

$T_{IN}$ and $T_{OUT}$ are analogous to the first temperature and second temperature, respectively, discussed in reference to FIG. 8A, and all of the considerations regarding sensing of the first and second temperatures in that discussion also apply to $T_{IN}$ and $T_{OUT}$. However, because $T_{IN}$ and $T_{OUT}$ are used to infer the direction of the average or integrated heat flux, rather than just the direction of the instantaneous heat flux, there is an additional consideration associated with $T_{OUT}$. If $T_{OUT}$ is sensed on the window-side of the shading device, and if direct sunlight reaches the temperature sensor, $T_{OUT}$ can be driven much higher than the exterior air temperature. In some situations, this could cause the moving sum updated in step 245 to indicate a much larger net heat flux than is actually the case, in turn causing a mismatch between the inferred and actual HVAC modes. If this proves to be a problem, it can be mitigated by limiting the maximum value of $T_{OUT}$, shielding the temperature sensor so that it does not receive direct sunlight, or by sensing $T_{OUT}$ on the room-side of the shading device.

Figure 8C:
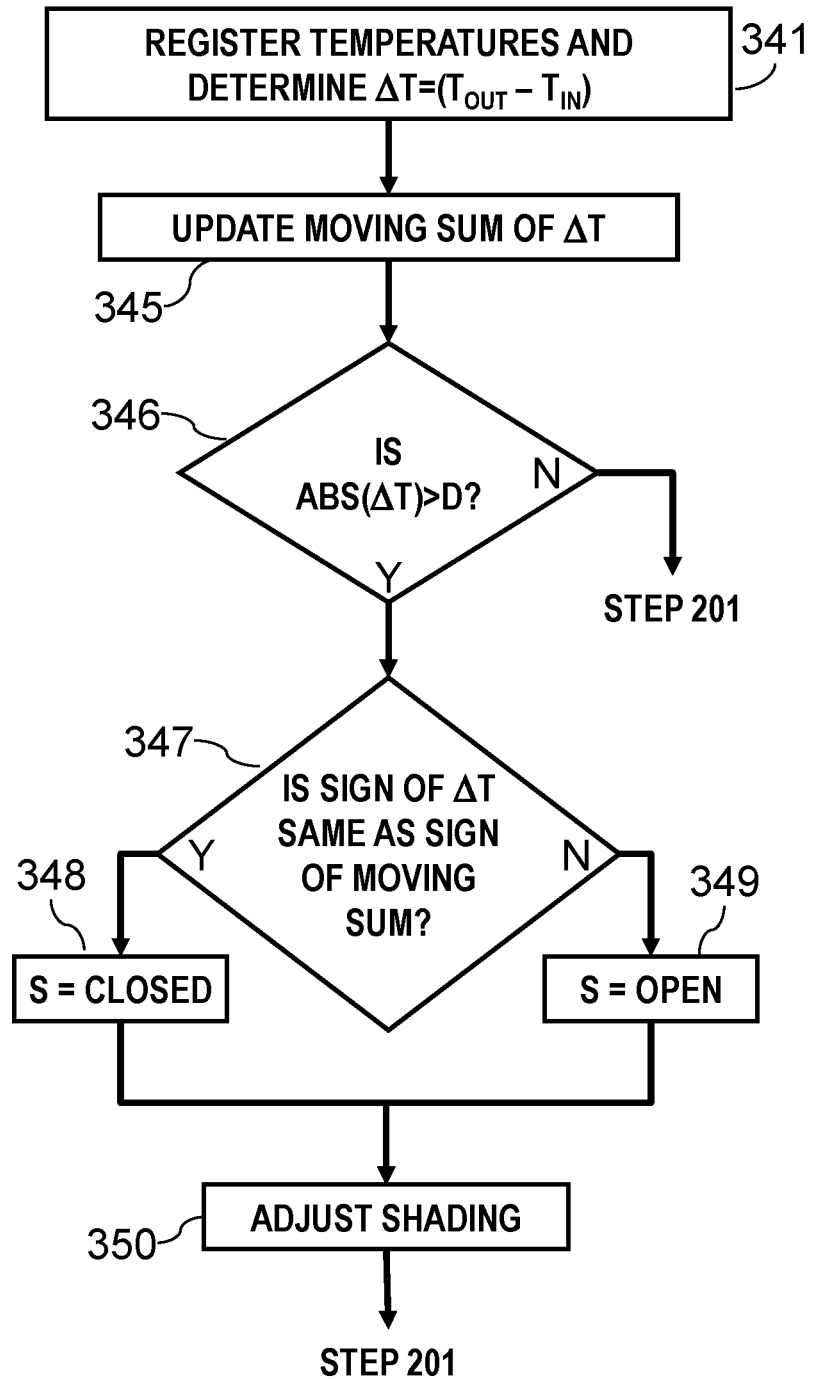
FIG. 8C is a flowchart of the operating sub-steps to implement a thermal management mode of the subject invention which relies exclusively on the inferred HVAC mode.

FIG. 8C: Thermal Management Mode Relying Exclusively on Inferred HVAC Mode

The thermal management protocol shown in FIG. 4 causes automated shading system 100 of FIG. 1 to adjust shading device 110 in a manner that depends on the actual mode of an HVAC system if such information is available, or on the inferred mode of the HVAC system if actual mode information is not available. As previously described, inference step 212' of FIG. 8B is a potentially advantageous way of using the inferred heat flux to infer the HVAC mode.

However, a thermal management protocol that relies exclusively on the inferred HVAC mode, even if actual HVAC mode information is available, will be advantageous in many applications. Not only would such an implementation be simpler and less expensive, it could also save more energy in certain circumstances.

This is because the actual HVAC mode may not always be one which opposes the average heat flux through the window. For example, an especially sunny window could be experiencing a daily heat gain while the HVAC system is in the heating mode. Such a situation can also occur during large fluctuations in the outside temperature if the response time of the HVAC system in changing modes is greater than the thermal time-constant of the perimeter zone in which the window is located, which is often the case.

In such situations, an automated shading system implementing a thermal management protocol based on the inferred HVAC mode (per FIG. 8B) will save more energy than one based on the actual HVAC mode. Such a system could be implemented, e.g., by having controller 120 of FIG. 1 proceed directly from step 205 of FIG. 3 to step 212' of FIG. 8B, bypassing step 211 of FIG. 4.

A functionally equivalent, but simpler, way of implementing this is shown in FIG. 8C. In this implementation, the steps shown in FIG. 8C are performed by controller 120 of FIG. 1 after selection step 205 of FIG. 3, and instead of the steps of FIG. 4. The steps of FIG. 8C are as follows:

As noted above, the steps of FIG. 8C are performed after the Thermal Management mode is selected in step 205 of FIG. 3, beginning with a registering step 341 (which is equivalent to registering step 241 of FIGS. 8A and 8B) to register temperatures $T_{IN}$ and $T_{OUT}$ and determine $\Delta T$.

Next, a moving summation step 345 (which is equivalent to moving summation step 245 of FIG. 8B) is performed to update the moving sum of $\Delta T$.

A decision step 346 (which is equivalent to decision step 242 of FIG. 8A) is then performed in which the magnitude of the temperature difference $\Delta T$ is compared to deadband D. If the magnitude of $\Delta T$ does not exceed D, operation branches to decision step 201 of FIG. 3.

Otherwise, if the magnitude of $\Delta T$ exceeds D, a decision step 347 is performed in which the sign of $\Delta T$ is compared to the sign of the moving sum of $\Delta T$. If the signs are the same, operation branches to an assignment step 348; if the signs are not the same, operation branches to an assignment step 349.

In assignment steps 348 and 349, the shading setting S for the thermal management mode is set to the closed and open settings respectively.

Thereafter, an adjustment step 350 (which is equivalent to adjustment step 214 of FIGS. 4 and 8A) is performed to adjust the shading to shading setting S (if not already at shading setting S). Finally, operation returns to step 201 of FIG. 3.

Thus, the thermal management steps of FIG. 8C cause the shading to be closed when the signs of the $\Delta T$ and the moving sum of the $\Delta T$ are the same, and opened when the signs are different. Adjusting the shading in this way modulates the instantaneous heat flux through the window (represented by $\Delta T$) so that it tends to oppose the integrated or time-averaged heat flux (represented by the moving sum of $\Delta T$). Thus, a shading system such as system 100 of FIG. 1, when implementing the steps of FIG. 8C, operates independently of the HVAC system (and without regard to the actual HVAC mode) to reduce the HVAC loads.

All of the implementation alternatives described previously in connection with FIGS. 8A and 8B (including different ways of obtaining the temperatures $T_{IN}$ and $T_{OUT}$) also apply to the steps shown in FIG. 8C.

Use of Integral or Moving Average Instead of Moving Sum

In steps 247 and 347 of FIGS. 8B and 8C, respectively, decisions are made on the basis of the sign of the moving sum of the thermal gradient $\Delta T$. The moving sum is a discrete-time approximation of the integral of the relative heat flux over the summation interval, so a definite integral over the same interval could be used instead of the moving sum. Further, because the sign of a definite integral of a variable over an interval is equivalent to the sign of the average of that variable over the same interval, a moving-average of the thermal gradient $\Delta T$ could be used (instead of a moving sum) as the basis for inferring the HVAC mode. This could be implemented, e.g., by performing an averaging step instead of summation steps 245 and 345 (of FIGS. 8B and 8C respectively), in which a moving-average of $\Delta T$ is updated, and by testing that moving average (instead of the moving sum) in steps 246 and 247 (of FIG. 8B) and 346 and 347 (of FIG. 8C). Of course, this would entail reducing the value of D' of step 246 accordingly.

Applying Offsets or Multipliers to Thermal Gradient or Moving Sum

It may be advantageous in some applications to apply an offset (i.e. either an addend or a subtrahend) to the thermal gradient $\Delta T$ obtained in step 241 of FIGS. 8A and 8B and step 341 of FIG. 8C. It may also be advantageous to apply such an offset to the moving sum obtained in step 245 of FIG. 8B and step 345 of FIG. 8C. For example, such an offset could be useful in mitigating the effects of a known bias in the temperatures used to obtain $\Delta T$ (e.g. due to thermal stratification, as previously noted). As another example, in a building with heavy year-round cooling loads, it may be advantageous to add a positive offset to either or both $\Delta T$ or the moving sum to bias the operation of system 100 toward minimizing cooling loads. Such an offset could be a constant, or it could be made to vary (e.g. as a function of building occupancy or environmental conditions). The thermal gradient and moving sum referenced herein should be construed to include any such offsets.

Similarly, a multiplier applied to either or both of the thermal gradient and moving sum could also be advantageous, e.g. for adjusting the sensitivity of the system. The thermal gradient and moving sum referenced herein should be construed to include any such multipliers.

Thus, at the point at which decisions are made on the basis of $\Delta T$ (specifically in steps 242 and 244 of FIG. 8A and steps 346 and 347 of FIG. 8C), $\Delta T$ need only vary with—and not necessarily be equal to—the difference between $T_{OUT}$ and $T_{IN}$.

Similarly, at the point at which decisions are made on the basis of the moving sum, specifically in steps 246 and 247 of FIG. 8B and step 347 of FIG. 8C, the moving sum need only vary with—and not necessarily be equal to—the actual moving sum of $\Delta T$.

Use of Alternative Sampling and Summation Intervals

As noted previously, summation steps 245 and 345 of FIGS. 8B and 8C, respectively, maintain a moving sum of hourly samples of thermal gradient $\Delta T$ over a summation interval of 24 hours, so that the sign of the moving sum represents the direction of the daily heat flux through the window. However, different sampling and summation intervals may be advantageous in some situations.

The sampling interval should be short enough to sample significant fluctuations in the external temperature. A one-hour sampling interval appears sufficiently short for most applications, but a shorter sampling interval could make the system more effective if rapid fluctuations are expected.

To maximize HVAC energy savings, the summation interval should ideally be comparable to the thermal time-constant of the perimeter area in which automated shading system 100 of FIG. 1 is located. If the summation interval is much longer than the thermal time-constant, then the system will take longer than necessary to infer a change in the HVAC mode, reducing the potential energy savings.

On the other hand, a summation interval much shorter than the thermal time constant will also reduce potential savings because it will prevent full exploitation of the perimeter area's thermal mass. For example, consider a situation in which the outside temperature temporarily rises from well below the HVAC set-point to well above the set-point. In such a situation, the area's thermal mass reduces HVAC energy consumption because it stores thermal energy from the temporary increase in outside temperature, which energy is released later as the temperature drops to its original level, thereby reducing the heating load. To fully exploit this effect, an automated shading system should continue to maximize the average heat flux into the area (i.e. it should continue to operate as if the HVAC system were in heating mode) until substantially all of this energy is stored. However, if the summation interval is shorter than the thermal time-constant, then the inferred HVAC mode will change from heating to cooling too quickly, thereby reducing the energy savings. Therefore, while it is expected that a summation interval of 24 hours will be suitable in many applications, energy savings can be maximized if a building-specific summation interval is used.

Alternative Shading Settings for Thermal Management Mode

Reference is made herein to Closed and Open settings of shading device 110 of FIG. 1. For example, step 244 of FIG. 8A and steps 348 and 349 of FIG. 8C refer to the Closed and Open shading settings in reference to the Thermal Management mode. In order to minimize loads on the HVAC system and thereby maximize energy savings, the Closed setting should be one in which the shading device is fully closed, and the Open setting should be one in which the shading device is fully open.

However, the system described herein can still save energy even if the Closed and Open settings do not result in the shading device being fully closed and fully open, respectively. All that is necessary to achieve at least some energy savings is that the shading device should be more closed in the closed setting, and more open in the open setting, than would be the case if system 100 were not operating in the Thermal Management mode as described herein.

Further, in some applications it may be advantageous to sacrifice some HVAC energy savings by not operating the shading device to the fully open or fully closed positions. For example, during daytime in the cooling season, it may be advantageous to ensure that the shading device is never fully closed, in order to admit some daylight for natural illumination. This can be achieved by the system described herein via adjusting the closed and open settings as appropriate. The closed and open settings referenced herein should be construed to include any such adjustments.

Specifically, the closed setting should be construed as one that results in the shading device being either (a) fully closed, or (b) more closed than it would otherwise be. Accordingly, for the purposes of this disclosure, to "close" a shading device is to operate it toward—but not necessarily to—its fully closed position.

Similarly, the open setting should be construed as one that results in the shading device being either (a) fully opened, or (b) more open than it would otherwise be. Accordingly, for the purposes of this disclosure, to open a shading device is to operate it toward—but not necessarily to—its fully open position.

Single-Mode Versus Multi-Mode Operation

As shown in FIG. 3, an advantageous embodiment of the subject invention can operate in any of three modes (thermal management, preferred-setting, and daylighting) depending on the prevailing conditions. However, advantageous embodiments are possible which have a greater or fewer number of operating modes.

For example, when used in an area which is seldom occupied, system 100 could operate in the thermal management mode exclusively, eschewing the preferred-setting and daylighting modes.

As another example, when used in an area which does not have a daylight-harvesting lighting system, system 100 could eschew the daylighting mode and operate exclusively in the thermal management and preferred-setting modes.

Modular Configuration of System 100

As previously stated, system 100 of FIG. 1 is capable of providing automated shading functionality on its own, without need for connectivity to external devices or systems. As such, it is envisioned to be distributed as a complete system containing all of the elements (with the potential exception of high-level interface 160, which could be retrofitted at a later time) shown in FIG. 1.

However, whether system 100 is capable of providing automated shading functionality on its own, or whether it is distributed as a complete system, are incidental to the subject invention. For example, the elements of system 100 could be produced and distributed separately. The trend in the art is toward modular functionality by which a system such as system 100 can be assembled from modules obtained from different sources and at different times. The subject invention could still be used—and would still be advantageous—with such a system.

One potentially advantageous modular configuration is one in which controller 120 has an expansion bus and one or more physical sockets to implement a modular interface. Each of the elements shown in FIG. 1 could be implemented as a module which is electrically and physically compatible with the interface. This would enable the system to support alternative versions of each of the elements, e.g. different types of high-level interface 160, via different modules.

Another potentially advantageous configuration is one in which controller 120 has a virtual expansion bus implemented via one or more wireless interfaces. Each of the elements shown in FIG. 1 could then be implemented as a module which interfaces wirelessly with controller 120. Such modules could be sold and distributed separately from controller 120.

Figure 8D:
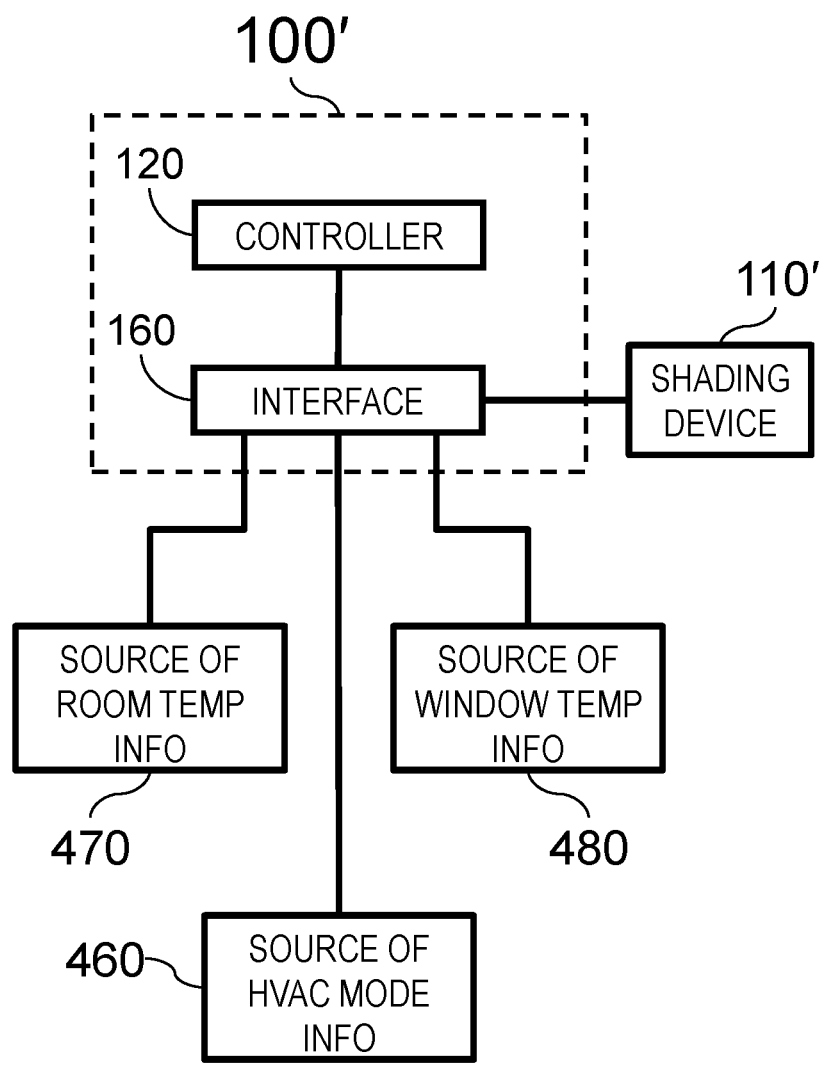
FIG. 8D is a block diagram of an alternative embodiment of the subject automated shading system.

FIG. 8*d*: Modular Configuration for Thermal Management

FIG. 8D shows such a modular embodiment of system 100, a system 100', for controlling a shading device in a window in a room according to the thermal management protocols shown in FIGS. 8A through 8C. It consists of controller 120 and interface 160 (both previously described in reference to FIG. 1). Controller 120 exchanges information with the following external devices via interface 160:

- A shading device 110' is a conventional automated shading device which can be commanded to open or close via commands over an interface, with which it is connected to controller 100'. Shading device 110' could be, e.g., a commercially-available motorized window covering with a WiFi or ZigBee interface.
- An optional source of HVAC mode info 460 is a source of an HVAC mode signal representing the mode of an HVAC system, e.g. the HVAC system itself.
- A source of room temp info 470 is a source of a room temperature signal representing a temperature closer to the temperature of the room than the temperature of the window, e.g. as previously described in reference to FIG. 8A.
- A source of window temp info 480 is a source of a window temperature signal representing a temperature closer to the temperature of the window than the temperature of the room, e.g. as previously described in reference to FIG. 8A.

System 100' performs the steps shown in FIGS. 8A-8C in the same way as previously described for system 100, except for the following changes:

- When performing step 241 of FIGS. 8A and 8B and step 341 of FIG. 8C, controller 120 obtains the room temperature signal from source 470 and the window-temperature signal from source 480 over interface 160, and registers the signals as $T_{IN}$ and $T_{OUT}$, respectively.
- When executing step 244 of FIG. 8A, controller 120 registers the HVAC mode signal from source 480 over interface 160 and interprets it as the actual HVAC mode.
- When performing step 214 of FIG. 8A and step 350 of FIG. 8C, controller 120 adjusts the shading by issuing commands to shading device 110' over interface 160.

Thus, system 100' can implement the same thermal management protocols as system 100 of FIG. 1, except that system 100' need not include a shading device or sources of room temperature, window temperature, or HVAC mode information, and can therefore be distributed and installed separately from such elements. Further, any automated shading product, building-management system, or home-automation system that already includes hardware functionality equivalent to system 100' can be upgraded to implement the thermal management protocols described herein without need for hardware modifications, via firmware or software upgrades.

If desired, system 100' can also be adapted to implement other automated shading protocols, as previously described in reference to FIGS. 3, 5, and 6 for system 100 of FIG. 1.

Alternative Operating Steps

Key aspects of the operation of the subject invention include the incorporation of a benefits hierarchy, or an information hierarchy, or both, in an automated shading protocol. Implementation of these aspects involves either or both of the following:

- Defining a hierarchy of benefits to be provided by an automated shading protocol, defining an operating mode for each benefit, and selecting the operating mode which provides the greatest benefit according to the hierarchy.
- Defining a hierarchy of sources of information needed by an automated shading protocol, identifying which of the available sources ranks highest in the hierarchy, and then using that source for the needed information.

The operating steps of the preferred embodiment described above are only one of many ways to implement these aspects of the subject invention. For example, the implementation may vary in the following ways without departing from the spirit and scope of the invention:

- Alternate prioritization of benefits in the hierarchy. The specific prioritization of benefits described in reference to the preferred embodiment (i.e. occupant satisfaction over energy savings, daylighting over thermal management) is incidental to the essence of the invention, and an alternate prioritization could be used. For example, in buildings which are expected to be only infrequently occupied, occupant satisfaction could be ranked lower in the hierarchy.
- Alternate prioritization of information sources in the hierarchy. The specific prioritization of information sources described in reference to the preferred embodiment (i.e. a BMS-supplied shading setting assigned the highest priority) is incidental to the essence of the invention, and an alternate prioritization could be used. For example, in the thermal management mode, the output of a thermal gradient sensor as described herein could be assigned a higher priority than a BMS-supplied shading setting.
- Different or additional benefits in the hierarchy. For example, occupant satisfaction could be resolved into sub-benefits, such as comfort, convenience, privacy, and security, with different modes or sub-modes provided to maximize each benefit. For example, in a security mode, the shading could be adjusted periodically when the occupied bit is reset in order to foster an illusion of occupancy.
- Different or additional information sources in the hierarchy. For example, the on/off state of the lighting system could be added to the hierarchy (as previously described) to help determine the required shading setting for the preferred-setting mode. A calendar (along with a schedule of events) could also be used to help determine the required shading setting for all three modes. Weather predictions could also be used to more reliably determine the shading setting in all three modes. This additional information could be provided via an expanded version of low-level interface 150 (in the case of discrete bits of information), high-level interface 160, or additional hardware included in system 100.
- Different methods of using available information to define shading settings. For example, instead of closed-loop operation in the daylighting mode, the system could use open-loop operation to regulate the daylight level. As noted above, the state of the lighting system could be used to determine the required shading setting in the preferred-setting mode (i.e. closed shading at nighttime with the lights on, open shading with the lights off). Weather predictions could be used to determine the required shading setting in the thermal-management mode.

Alternative Contexts for Information Hierarchy

In the preceding description, information hierarchies have been discussed in the context of information needed by an automated shading protocol to select an operating mode, or to determine a shading setting, or both. However, the concept of information hierarchies according to the subject invention can also be applied to the operating modes or shading settings themselves.

Figure 9A:
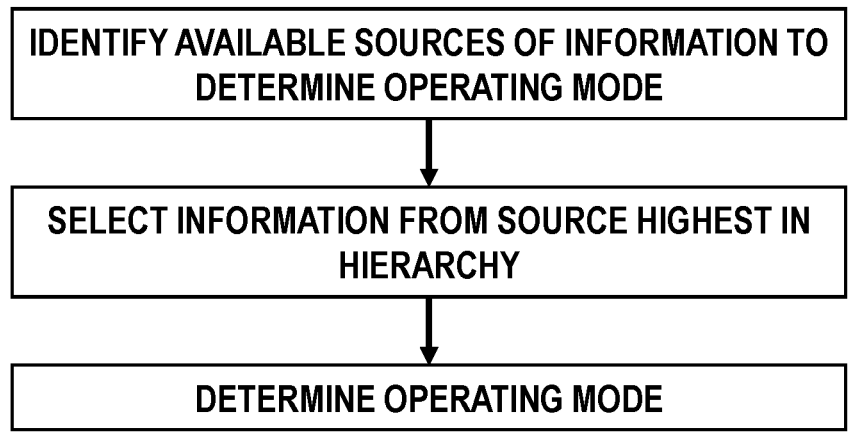
FIGS. 9A and 9B are flowcharts of preferred and alternative steps to establish an operating mode of an automated shading system according to the subject invention.
Figure 9B:
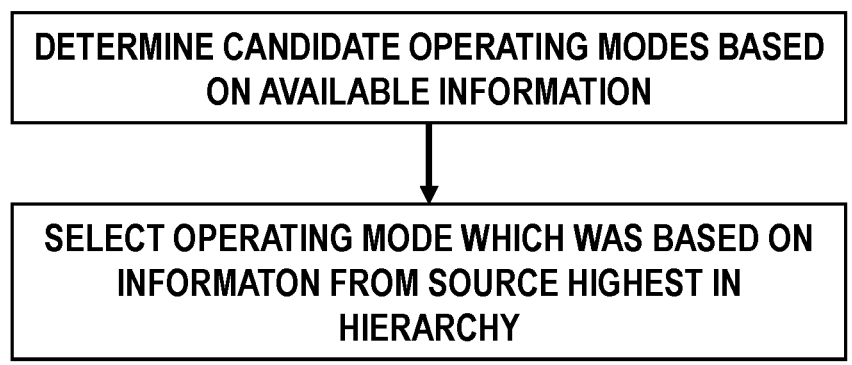

FIGS. 9A and 9B: Information Hierarchies to Select Operating Modes

FIGS. 9A and 9B show two approaches according to the subject invention to use an information hierarchy to select an operating mode. FIG. 9A summarizes the approach taken in the preferred embodiment: the hierarchy is applied prior to selection of the operating mode, while in the approach of FIG. 9B, the hierarchy is applied after selection of the operating mode.

Referring to both FIGS. 1 and 9B, an example of an advantageous embodiment using the approach of FIG. 9B would be one in which there are three sources of operating mode information: controller 120, which selects a candidate operating mode on the basis of the output of daylight sensor 140 and information obtained on low-level interface 150; an occupant, who selects a candidate operating mode via user interface 130; and a Building Management System (BMS), which selects a candidate operating mode and issues it to system 100 via high-level interface 160. For such a system, a hierarchy could be pre-defined in which the user-selected operating mode has the highest priority, the BMS-selected operating mode has the second priority, and the operating mode selected by controller 120 has the lowest priority.

Figure 10A:
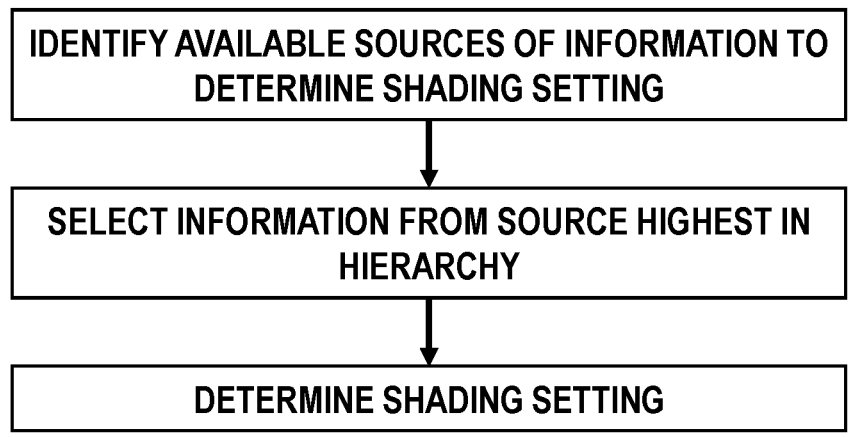
FIGS. 10A and 10B are flowcharts of preferred and alternative steps to determine a shading setting in an automated shading system according to the subject invention.
Figure 10B:
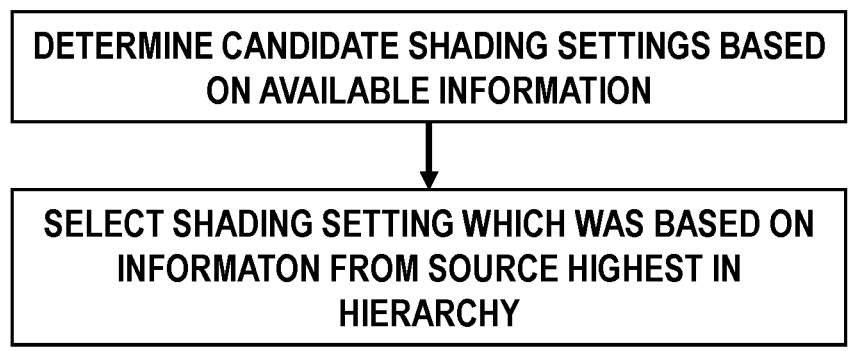

FIGS. 10A and 10B: Information Hierarchies to Determine Shading Settings

Similarly, FIGS. 10A and 10B show two approaches according to the subject invention to use an information hierarchy to determine a shading setting. FIG. 10A summarizes the approach taken in the preferred embodiment: the hierarchy is applied prior to determination of the shading setting, while in FIG. 10B, the hierarchy is applied after determination of the shading setting.

Referring to both FIGS. 1 and 10B, an example of an advantageous embodiment using the approach of FIG. 10B would be one in which controller 120 determines two shading settings (one intended to maximize savings from daylighting, and one that minimizes HVAC loads), and in which a BMS can also determine an "optimum" shading setting that minimizes overall energy consumption (considering both lighting and HVAC loads). For such a system, a hierarchy could be pre-defined in which the BMS-determined shading setting has the highest priority, the daylighting-driven shading setting has the second priority, and HVAC-driven setting has the lowest priority.

Externally Applied or Defined Hierarchies

Per the preceding discussion, hierarchies can be applied or defined within an automated shading system, but they can also be applied or defined externally.

Specifically, in system 100, pre-defined benefit and information hierarchies are applied in the steps of FIGS. 3-6 performed by controller 120. However, according to the subject invention, benefit or information hierarchies could be defined and applied externally to system 100. For example, multiple sources of shading setting (i.e. multiple competing shading commands) could be made available on high-level network 160, e.g. from a remote user interface, a daylighting system, an HVAC system, and an integrated BMS. Each such shading setting could be accompanied by a ranking datum that defines the priority of that shading setting. The automated shading system could then simply select the shading setting with the datum representing the highest ranking.

For example, a shading setting from a user interface located in the same room could have the highest priority, a shading setting produced by a remote user interface could have the second priority, a shading setting produced by a BMS system could have the third priority, a shading setting produced by a daylighting system could have the fourth priority, and a shading setting produced by an HVAC system could have the fifth priority.

The difference between such a system and the preferred embodiment is the location at which, and time at when, the hierarchies are applied, which is incidental to the essence of the subject invention. In other words, the automated shading system and method of the subject invention includes the elements and steps for applying benefits and information hierarchies in an automated shading protocol, regardless of where and when those steps are performed or what performs them.

Multi-Dimensional Hierarchies

The ranking or value of a benefit or information datum according to the subject invention can be multi-dimensional. For example, an automated shading protocol could apply a two-dimensional hierarchy to select between competing shading settings:

The first dimension could represent the priority of the benefit maximized by the shading setting. For example, a shading setting intended to maximize occupant satisfaction (e.g. a shading setting obtained from a user interface), could be assigned the highest priority, a shading setting aimed at maximizing daylighting savings could be assigned the next highest priority, and a shading setting aimed at minimizing HVAC loads could be assigned the lowest priority.

The second dimension could represent the confidence in the accuracy or reliability of the shading setting in achieving the intended benefit. For example, a shading setting in the daylighting mode could be assigned a relatively high priority if it is obtained via a closed-loop sensor, but a relatively low priority if it is obtained via an open-loop sensor. Similarly, a shading setting intended to minimize HVAC loads could be assigned a relatively high priority if it is obtained via a process that comprehends the building's thermal mass and weather predictions, and a relatively low priority if it is based only on the prevailing season.

An algorithm could then be used to select the best available information source as a function of the two ranking dimensions.

Conditional Hierarchies

According to the subject invention, benefits and information hierarchies used in the system need not be fixed, but may instead vary in a predefined way with changing conditions. For example, in the benefits hierarchy described in connection with the preferred embodiment, daylighting is assigned a higher priority than the thermal management mode. However in buildings with a very low installed Lighting Power Density (e.g. due to state-of-the-art LED lighting), less savings would be achieved through daylighting, so that it would be advantageous to assign thermal management a higher priority. Thus, in this example, the benefits hierarchy could be based on the installed Lighting Power Density.

CONCLUSIONS, RAMIFICATIONS, AND SCOPE

As this disclosure makes clear, the automated shading system and method of the subject invention can automatically adapt to varying levels of integration with other devices and systems, ranging from the ability to operate fully autonomously (with no integration), to the ability to operate in a partially integrated mode via low-level integration with other systems in a manner which avoids risks associated with high-level integration, to the ability to operate in a fully integrated manner with other systems. Further, it can automatically adapt to varying types and quality of information from external sources. Thus, an automated shading system according to the subject invention can be advantageously deployed in a variety of ways, and can grow to support increasing levels of integration without the need for immediate commitment to any particular integration standard or technology.

Those skilled in the art will recognize that the construction, function, and operation of the elements composing the preferred and alternative embodiments described herein may be modified, eliminated, or augmented to realize many other useful embodiments, without departing from the scope and spirit of the invention as disclosed herein and recited in any appended claims.

I claim:

1. An automation system for automating an adjustable shading device on a window in a room, said automation system including:
   a. first temperature-determining means to determine a first temperature closer to the temperature of said room than to the temperature of said window;
   b. second temperature-determining means to determine a second temperature closer to the temperature of said window than to the temperature of said room;
   c. first processing means to produce a difference signal which varies with said second temperature minus said first temperature;
   d. second processing means to produce an integral signal which varies with the time-integral, over an interval, of said difference signal; and
   e. a controller to adjust said shading device to a shading setting which depends on said integral signal.

2. The automation system of claim 1 wherein said interval is at least one day.

3. The automation system of claim 1 wherein said first temperature-determining means includes a first temperature sensor and said second temperature-determining means includes a second temperature sensor, and said second temperature sensor is closer to said window than is said first temperature sensor.

4. The automation system of claim 1 wherein said first temperature-determining means includes an interface for obtaining temperature information from another system.

5. The automation system of claim 1 wherein said first temperature is an assumed temperature.

6. The automation system of claim 1 wherein said second temperature-determining means includes an interface for obtaining temperature information from another system.

7. The automation system of claim 1 wherein said shading setting depends on said difference signal.

8. The automation system of claim 7 wherein said controller is capable of at least one of the following:
   a. closing said shading device if said difference signal is greater than a first difference threshold and said integral signal is greater than a first integral threshold,
   b. closing said shading device if said difference signal is less than a second difference threshold and said integral signal is less than a second integral threshold,
   c. opening said shading device if said difference signal is less than a third difference threshold and said integral signal is greater than a third integral threshold, and
   d. opening said shading device if said difference signal is greater than a fourth difference threshold and said integral signal is less than a fourth integral threshold.

9. An automation system for automating an adjustable shading device on a window in a room, said room being space-conditioned by an HVAC system, said automation system including:
   a. first temperature-determining means to determine a first temperature closer to the temperature of said room than to the temperature of said window;
   b. second temperature-determining means to determine a second temperature closer to the temperature of said window than to the temperature of said room;
   c. first processing means to produce a difference signal which varies with said second temperature minus said first temperature;
   d. mode-determining means to determine an operating mode of said HVAC system; and
   e. a controller to adjust said shading device to a shading setting which depends on said difference signal and said operating mode.

10. The automation system of claim 9 wherein said first temperature-determining means includes a first temperature sensor and said second temperature-determining means includes a second temperature sensor, and said second temperature sensor is closer to said window than is said first temperature sensor.

11. The automation system of claim 9 wherein said first temperature-determining means includes an interface for obtaining temperature information from another system.

12. The automation system of claim 9 wherein said first temperature is an assumed temperature.

13. The automation system of claim 9 wherein said second temperature-determining means includes an interface for obtaining temperature information from another system.

14. The automation system of claim 9 wherein said controller is capable of at least one of the following:
   a. closing said shading device if said difference signal is greater than a first difference threshold and said operating mode is a cooling mode,
   b. closing said shading device if said difference signal is less than a second difference threshold and said operating mode is a heating mode,
   c. opening said shading device if said difference signal is less than a third difference threshold and said operating mode is a cooling mode, and
   d. opening said shading device if said difference signal is greater than a fourth difference threshold and said operating mode is a heating mode.

15. An automation system for automating an adjustable shading device on a window in a room, said room being space-conditioned by an HVAC system, said automation system including:

a. processing means to produce an integral signal which varies with the time-integral, over an interval, of a thermal gradient in said room;
b. mode-determining means to determine an operating mode of said HVAC system, and
c. a controller to adjust said shading device to a shading setting which depends upon either said mode signal or said integral signal.

16. The automation system of claim 15 wherein said interval is at least one day.

17. The automation system of claim 15 wherein said mode-determining means includes an interface to obtain HVAC operating mode information from another system.

\* \* \* \* \*